United States Patent
Ueki

(10) Patent No.: US 7,697,385 B2
(45) Date of Patent: Apr. 13, 2010

(54) METHOD AND APPARATUS FOR CONTROLLING RECORDING LASER POWER

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 1049 days.

(21) Appl. No.: 11/008,660

(22) Filed: Dec. 10, 2004

(65) Prior Publication Data

US 2005/0163007 A1 Jul. 28, 2005

(30) Foreign Application Priority Data

Jan. 28, 2004 (JP) ............................. 2004-019817

(51) Int. Cl.
*G11B 7/00* (2006.01)

(52) U.S. Cl. .................. 369/47.53; 369/59.11; 369/116

(58) Field of Classification Search .............. 369/47.53, 369/59.11, 116

See application file for complete search history.

(56) References Cited

U.S. PATENT DOCUMENTS

| | | | | |
|---|---|---|---|---|
| 6,621,779 | B1 * | 9/2003 | Inokuchi et al. | 369/47.51 |
| 7,023,773 | B2 * | 4/2006 | Park | 369/47.53 |
| 7,088,651 | B2 * | 8/2006 | Kim | 369/47.22 |
| 2002/0003760 | A1 | 1/2002 | Honda | |
| 2002/0097647 | A1 * | 7/2002 | Sakata et al. | 369/47.28 |
| 2002/0098806 | A1 | 7/2002 | Park | |
| 2002/0118620 | A1 * | 8/2002 | Lee et al. | 369/53.21 |
| 2002/0131350 | A1 * | 9/2002 | Kurobe et al. | 369/47.4 |
| 2003/0063535 | A1 | 4/2003 | Shoji et al. | |

FOREIGN PATENT DOCUMENTS

| | | |
|---|---|---|
| EP | 1326239 | 7/2003 |
| JP | 2000-149259 | 5/2000 |
| JP | 2001-331940 | 11/2001 |
| JP | 2003-217124 | 7/2003 |
| JP | 2003-318251 | 11/2003 |
| JP | 2003-346337 | 12/2003 |

\* cited by examiner

*Primary Examiner*—Wayne R Young
*Assistant Examiner*—LaTanya Bibbins
(74) *Attorney, Agent, or Firm*—Louis Woo

(57) ABSTRACT

Test signals are sequentially generated. A laser beam inclusive of the generated test signals is applied to a preset test recording area in a disc-shaped recording medium to record the generated test signals thereon. A recording power of the applied laser beam is changed stepwise from a lowest level to a highest level through different intermediate levels. The lowest level, the highest level, and the intermediate levels the recording power of the applied laser beam takes are assigned to the test signals respectively. The recorded test signals are reproduced from the preset test recording area in the disc-shaped recording medium. An optimum value of a laser-beam recording power is decided on the basis of the reproduced test signals and at least one of the lowest level, the highest level, and the intermediate levels.

10 Claims, 10 Drawing Sheets

METHOD AND APPARATUS FOR CONTROLLING RECORDING LASER POWER

BACKGROUND OF THE INVENTION

1. Field of the Invention

This invention generally relates to a method and an apparatus for controlling a recording laser power. This invention specifically relates to a method and an apparatus for controlling the recording power of a laser beam applied to a disc-shaped recording medium or an optical disc such as a DVD-R, a DVD-RW, a DVD+RW, or a DVR-Blue.

2. Description of the Related Art

Optical discs contain a CD (compact disc) and a DVD (digital versatile disc). A CD-RW, a DVD-R, a DVD-RW, a DVD+RW, and a DVR-Blue are disc-shaped recording mediums of an organic dye type or a phase change type which each have a continuous recording track and address information intermittently formed along a side of the track at intervals corresponding to a prescribed recording unit.

There is a drive apparatus for optically recording and reproducing an information signal on and from such a disc-shaped recording medium while applying a laser beam thereto. During the recording of the information signal on the disc-shaped recording medium, the drive apparatus modulates the laser beam in accordance with the information signal. The drive apparatus includes an optical pickup for emitting the laser beam toward the disc-shaped recording medium and receiving a laser beam returned therefrom. The quality of the recording of the information signal on the disc-shaped recording medium depends on various factors such as the physical and optical characteristics of the disc-shaped recording medium, the performance of the optical pickup, and the wavelength of the laser beam. Thus, the optimum power of the laser beam for recording the information signal varies from medium to medium, and also varies from pickup to pickup.

Accordingly, it is desirable to determine the optimum value of the recording power of a laser beam when a disc-shaped recording medium is placed in a drive apparatus. Furthermore, it is desirable to control the recording power of the laser beam at the determined optimum value during the actual recording of an information signal on the disc-shaped recording medium. An example of the control of the recording laser beam power is of a feedback type including a step of detecting the actual value of the recording laser beam power, a step of comparing the detected actual power value with the optimum power value, and a step of adjusting the actual power value in response to the result of the comparison.

There are various methods of determining the optimum value of the recording power of a laser beam for a disc-shaped recording medium of an organic dye type or a phase change type.

Some recordable optical discs are designed to be scanned by a laser beam at a constant linear velocity (CLV). Typical examples of such recordable optical discs are a CD-R and a CD-RW. It is known that a recordable optical disc is driven while being scanned by a laser beam at a constant linear velocity higher than the standard value.

Japanese patent application publication number P2001-331940A discloses an optical disc having a program area and a test area extending outward of the program area. In Japanese patent application P2001-331940A, test recording and reproduction are implemented before main-data recording. During the test recording and reproduction, the optical disc remains scanned by a laser beam at a prescribed linear velocity higher than the standard value, and a test signal is recorded plural times on the test area of the optical disc as the recording power of the laser beam is changed in turn among different values on a decreasing stepwise basis. Consequently, there are recorded test signals on the test area of the optical disc which correspond to the different values of the recording power of the laser beam, respectively. The recorded test signals are reproduced from the test area of the optical disc. An optimum recording power value of the laser beam for the prescribed linear velocity of the scanning of the optical disc is decided on the basis of the reproduced test signals. During the main-data recording which follows the test recording and reproduction, the recording power of the laser beam is controlled at the decided optimum value.

There is an optical disc having a data area and a test area extending inward of the data area. In some cases, such an optical disc is subjected to test recording and reproduction while being scanned by a laser beam at a constant linear velocity higher than the standard value. Specifically, during the test recording and reproduction, a test signal is recorded plural times on the test area of the optical disc as the recording power of the laser beam is decreased stepwise. Consequently, there are recorded test signals on the test area of the optical disc which correspond to the different values of the recording power of the laser beam, respectively. The recorded test signals are reproduced from the test area of the optical disc. An optimum recording power value of the laser beam is decided on the basis of the reproduced test signals.

In the case of CLV-based drive of an optical disc, the rotational speed of the optical disc is increased as a portion of the optical disc which is currently scanned by a laser beam radially moves from the outermost position of the optical disc to the innermost position thereof. For example, in the case of CLV-based drive of a DVD-R at a 8-fold linear velocity which means a linear velocity equal to 8 times the standard value, the rotational speed of the optical disc is increased to about 12,000 rpm when the innermost portion of the optical disc is scanned by a laser beam. Spontaneous vibration of an optical disc is greater as the rotational speed thereof is higher. Thus, in the case where a test area of the DVD-R extends inward of a data area thereof, the rotational speed of the DVD-R is relatively high and the spontaneous vibration thereof is relatively great during test recording and reproduction for which the test area of the DVD-R is scanned by a laser beam. The great spontaneous vibration of the DVD-R causes the formation of pits therein to be unstable. The unstable formation of pits means the unstable test recording and reproduction.

In Japanese patent application P2001-331940A, the test area of an optical disc extends outward of the program area thereof. Thus, the rotational speed of the optical disc is relatively low and the spontaneous vibration thereof is relatively small during the test recording and reproduction. Consequently, the test recording and reproduction is prevented from going unstable.

Japanese patent application P2001-331940A also discloses an optical disc having a program area, an inner test area extending inward of the program area, and an outer test area extending outward of the program area. The sizes of the inner and outer test areas of such an optical disc are finite. Therefore, under some recording conditions, one of the inner and outer test areas has been fully used for test recording and reproduction, and can not be used any more. Especially, in the case of high-speed drive of the optical disc, the strategy (the recording laser beam waveform) is complicated and the margin for jitter is small so that a wide area is used for test recording and reproduction. Thus, in this case, it is usual that one of the inner and outer test areas of the optical disc has been fully used for test recording and reproduction and only the other can be used for further test recording and reproduction.

There is an optical disc which can be driven at a constant linear velocity changeable among a 1-fold value (the standard value), a 2-fold value, a 4-fold value, a 6-fold value, and an 8-fold value. An 8-fold-speed optical-disc recorder drives such an optical disc at the 8-fold value. In this case, a required rotational speed of the optical disc is excessively high when an innermost portion of the optical disc is scanned by a laser beam. Accordingly, it is undesirable to implement test recording and reproduction using an inner test area of the optical disc. Thus, in this case, it is desirable to carry out only test recording and reproduction using an outer test area of the optical disc. On the other hand, a 2-fold-speed optical-disc recorder drives the optical disc at the 2-fold value. In this case, a required rotational speed of the optical disc remains acceptable even when an innermost portion of the optical disc is scanned by a laser beam. Thus, in this case, it is acceptable to carry out test recording and reproduction using both the inner and outer test areas of the optical disc. As understood from the above explanation, the speed performance of an optical-disc recorder decides whether or not the inner test area of the optical disc should be used for test recording and reproduction.

Generally, it is difficult to equalize the recording characteristics of the inner and outer test areas of an optical disc such as a DVD-R. In the case where an organic dye film is formed by spin coat during the fabrication of a DVD-R, a recording film in the outer test area is thicker than that in the inner test area. In the case where a resin layer of a polycarbonate substrate for a DVD-R is formed by injection molding from an inner side gate, it is difficult to make uniform the birefringence characteristics throughout a disc surface. Surface vibration and tilt in the outer test area of a DVD-R are greater than those in the inner test area thereof. The outer test area of a DVD-R tends to scratch and be given fingerprints. Therefore, the physical characteristics of the inner test area of a DVD-R differ from those of the outer test area thereof. Thus, it is difficult to obtain exactly equal results of test recording and reproduction using the inner test area of a DVD-R and test recording and reproduction using the outer test area thereof.

A DVD-R or a DVD-RW has a spiral track defined by a continuous groove in a recording disc surface. There are land portions between neighboring groove portions spaced in a radial direction of the disc. The land portions are previously formed with pits called land pre-pits (LPP) representing an address signal indicating the on-disc position of every unit segment of the track. The LPP address signal can be reproduced from the disc while the disc is scanned by a laser beam. The reproduced LPP address signal represents the currently-accessed on-disc position, the information of which can be used for essential purposes. During the recording of a signal on the disc, a laser beam modulated in accordance with the signal to be recorded forms recording marks in the groove of the disc. As the recording power of the laser beam applied to the disc is raised, the size of recording marks formed in the groove increases. When the recording power of the laser beam is raised above a particular value, some of formed recording marks reach land pre-pits (LPP). It is difficult to correctly reproduce the LPP address signal from a disc in such a condition since land pre-pits (LPP) are hardly discriminated from recording marks. During test recording and reproduction, the recording power of the laser beam is set to a maximum level and is then decreased stepwise from the maximum level. Thus, the recording power of the laser beam may exceed the particular value in a former stage of the test recording and reproduction. In this case, there occurs the problem that the LPP address signal can not be correctly reproduced from the disc.

SUMMARY OF THE INVENTION

It is a first object of this invention to provide a method of controlling a recording laser power which includes a step of efficiently and accurately deciding an optimum value of the recording laser power.

It is a second object of this invention to provide an apparatus for controlling a recording laser power which includes a section for efficiently and accurately deciding an optimum value of the recording laser power.

It is a third object of this invention to provide a method of controlling a recording laser power which includes a step of guaranteeing that an LPP address signal can be correctly reproduced from a disc-shaped recording medium.

It is a fourth object of this invention to provide an apparatus for controlling a recording laser power which includes a section for guaranteeing that an LPP address signal can be correctly reproduced from a disc-shaped recording medium.

A first aspect of this invention provides a method of controlling a recording laser power for a disc-shaped recording medium on which an address signal is previously recorded for every prescribed recording unit related to a track in the disc-shaped recording medium. An information signal is recorded on the disc-shaped recording medium in cases where a laser beam containing the information signal is applied to the disc-shaped recording medium while the disc-shaped recording medium is driven and is scanned by the laser beam on a constant-linear-velocity basis. The method comprises the steps of sequentially generating test signals; applying a laser beam inclusive of the generated test signals to a preset test recording area in the disc-shaped recording medium while driving the disc-shaped recording medium at a predetermined constant linear velocity relative to the applied laser beam to record the generated test signals on the preset test recording area in the disc-shaped recording medium; changing stepwise a recording power of the applied laser beam from a lowest level to a highest level through different intermediate levels, wherein the lowest level, the highest level, and the intermediate levels the recording power of the applied laser beam takes are assigned to the generated test signals respectively; reproducing the recorded test signals from the preset test recording area in the disc-shaped recording medium; and deciding an optimum value of a laser-beam recording power on the basis of the reproduced test signals and at least one of the lowest level, the highest level, and the intermediate levels.

A second aspect of this invention is based on the first aspect thereof, and provides a method wherein the changing step comprises changing stepwise the recording power of the applied laser beam from the lowest level to a reference level selected from the intermediate levels through ones of the intermediate levels which are lower than the reference level; changing stepwise the recording power of the applied laser beam from the reference level to the highest level through ones of the intermediate levels which are higher than the reference level; and during the stepwise change of the recording power from the reference level to the highest level, setting the recording power of the applied laser beam to a prescribed level for each of spaced time intervals corresponding to portions of the disc-shaped recording medium on which address signals are previously recorded respectively; wherein the prescribed level is equal or close to the reference level.

A third aspect of this invention is based on the first aspect thereof, and provides a method wherein the changing step comprises during the stepwise change of the recording power from the lowest level to the highest level, setting the recording power of the applied laser beam to a prescribed level for each of spaced time intervals corresponding to portions of the disc-shaped recording medium on which address signals are previously recorded respectively; wherein the prescribed level is equal or close to the reference level.

A fourth aspect of this invention provides an apparatus for controlling a recording laser power for a disc-shaped recording medium on which an address signal is previously recorded for every prescribed recording unit related to a track in the disc-shaped recording medium. An information signal is recorded on the disc-shaped recording medium in cases where a laser beam containing the information signal is applied to the disc-shaped recording medium while the disc-shaped recording medium is driven and is scanned by the laser beam on a constant-linear-velocity basis. The apparatus comprises first means for sequentially generating test signals; second means for applying a laser beam inclusive of the test signals generated by the first means to a preset test recording area in the disc-shaped recording medium while driving the disc-shaped recording medium at a predetermined constant linear velocity relative to the applied laser beam to record the generated test signals on the preset test recording area in the disc-shaped recording medium; third means for changing stepwise a recording power of the laser beam applied by the second means from a lowest level to a highest level through different intermediate levels, wherein the lowest level, the highest level, and the intermediate levels the recording power of the applied laser beam takes are assigned to the generated test signals respectively; fourth means for reproducing the recorded test signals from the preset test recording area in the disc-shaped recording medium; and fifth means for deciding an optimum value of a laser-beam recording power on the basis of the test signals reproduced by the fourth means and at least one of the lowest level, the highest level, and the intermediate levels.

A fifth aspect of this invention is based on the fourth aspect thereof, and provides an apparatus wherein the third means comprises means for changing stepwise the recording power of the applied laser beam from the lowest level to a reference level selected from the intermediate levels through ones of the intermediate levels which are lower than the reference level; means for changing stepwise the recording power of the applied laser beam from the reference level to the highest level through ones of the intermediate levels which are higher than the reference level; and means for, during the stepwise change of the recording power from the reference level to the highest level, setting the recording power of the applied laser beam to a prescribed level for each of spaced time intervals corresponding to portions of the disc-shaped recording medium on which address signals are previously recorded respectively; wherein the prescribed level is equal or close to the reference level.

A sixth aspect of this invention is based on the fourth aspect thereof, and provides an apparatus wherein the third means comprises means for, during the stepwise change of the recording power from the lowest level to the highest level, setting the recording power of the applied laser beam to a prescribed level for each of spaced time intervals corresponding to portions of the disc-shaped recording medium on which address signals are previously recorded respectively; wherein the prescribed level is equal or close to the reference level.

A seventh aspect of this invention provides a method of controlling a recording laser power for an optical disc on which address signals are previously recorded for respective prescribed recording units related to a track in the optical disc. The method comprises the steps of generating test signals; applying a laser beam inclusive of the generated test signals to the track in the optical disc to record the generated test signals thereon; increasing stepwise a recording power of the applied laser beam from a lowest level to a highest level through different intermediate levels, wherein the lowest level, the highest level, and the intermediate levels the recording power of the applied laser beam takes are assigned to the generated test signals respectively; during the stepwise increase in the recording power of the applied laser beam, preventing the recorded test signals from interfering with the address signals previously recorded on the optical disc; reproducing the recorded test signals from the optical disc; and deciding an optimum value of a laser-beam recording power on the basis of the reproduced test signals and at least one of the lowest level, the highest level, and the intermediate levels.

An eighth aspect of this invention is based on the seventh aspect thereof, and provides a method wherein the preventing step comprises during the stepwise increase in the recording power of the applied laser beam, setting the recording power of the applied laser beam to a prescribed level substantially equal to an expected optimum level for each of spaced time intervals corresponding to portions of the optical disc at which the previously-recorded address signals exist respectively.

A ninth aspect of this invention provides an apparatus for controlling a recording laser power for an optical disc on which address signals are previously recorded for respective prescribed recording units related to a track in the optical disc. The apparatus comprises first means for generating test signals; second means for applying a laser beam inclusive of the test signals generated by the first means to the track in the optical disc to record the generated test signals thereon; third means for increasing stepwise a recording power of the applied laser beam from a lowest level to a highest level through different intermediate levels, wherein the lowest level, the highest level, and the intermediate levels the recording power of the applied laser beam takes are assigned to the generated test signals respectively; fourth means for, during the stepwise increase in the recording power of the applied laser beam by the third means, preventing the recorded test signals from interfering with the address signals previously recorded on the optical disc; fifth means for reproducing the recorded test signals from the optical disc; and sixth means for deciding an optimum value of a laser-beam recording power on the basis of the test signals reproduced by the fifth means and at least one of the lowest level, the highest level, and the intermediate levels.

A tenth aspect of this invention is based on the ninth aspect thereof, and provides an apparatus wherein the fourth means comprises means for, during the stepwise increase in the recording power of the applied laser beam, setting the recording power of the applied laser beam to a prescribed level substantially equal to an expected optimum level for each of spaced time intervals corresponding to portions of the optical disc at which the previously-recorded address signals exist respectively.

An eleventh aspect of this invention provides a method of deciding a laser power value for an optically-writable information recording medium having address information thereon. The method comprises the steps of repetitively generating a test signal of a prescribed unit; changing a laser power in turn among different values for first portions of prescribed time intervals respectively in synchronism with the repetitively-generated test signal and in relation to a timing of the address information; and setting the laser power lower than the different values for second portions of the prescribed time intervals respectively, wherein the second portions of the prescribed time intervals differ from the first portions thereof.

A twelfth aspect of this invention provides a method of deciding a laser power value for an optically-writable information recording medium having a plurality of sectors. The method comprises the steps of repetitively generating a test signal of a prescribed unit; changing a laser power in turn among different values for first portions of prescribed time intervals respectively in synchronism with the repetitively-generated test signal and in relation to the sectors; and setting the laser power lower than the different values for second portions of the prescribed time intervals respectively, wherein the second portions of the prescribed time intervals differ from the first portions thereof.

A thirteenth aspect of this invention provides an apparatus for deciding a laser power value for an optically-writable information recording medium having address information thereon. The apparatus comprises means for repetitively generating a test signal of a prescribed unit; means for changing a laser power in turn among different values for first portions of prescribed time intervals respectively in synchronism with the repetitively-generated test signal and in relation to a timing of the address information; and means for setting the laser power lower than the different values for second portions of the prescribed time intervals respectively, wherein the second portions of the prescribed time intervals differ from the first portions thereof.

A fourteenth aspect of this invention provides an apparatus for deciding a laser power value for an optically-writable information recording medium having a plurality of sectors. The apparatus comprises means for repetitively generating a test signal of a prescribed unit; means for changing a laser power in turn among different values for first portions of prescribed time intervals respectively in synchronism with the repetitively-generated test signal and in relation to the sectors; and means for setting the laser power lower than the different values for second portions of the prescribed time intervals respectively, wherein the second portions of the prescribed time intervals differ from the first portions thereof.

This invention provides advantages as follows. In this invention, during a time interval corresponding to a previously-recorded address signal on a disc-shaped recording medium, a test signal is recorded on the disc-shaped recording medium at a lowest recording laser power level. Therefore, the recording of the test signal is prevented from causing a disturbance in the reproduction of the previously-recorded address signal from the disc-shaped recording medium. Accordingly, even in the case where the disc-shaped recording medium undergoes test recording while being driven and scanned at a high constant linear velocity, the previously-recorded address signal can be utilized to the full after the test recording. Thus, even when an information signal is recorded on the disc-shaped recording medium by another drive apparatus, the recording of the information signal is prevented from halting. Therefore, it is possible to accurately implement the recording of the information signal on the disc-shaped recording medium.

In this invention, during a stepwise change of the recording laser power from a reference level to a highest level in test recording, the recording power of an applied laser beam is set to a prescribed level equal or close to the reference level for each of spaced time intervals corresponding to portions of a disc-shaped recording medium on which address signals are previously recorded respectively. Therefore, the recording of test signals on the disc-shaped recording medium prevents the occurrence of a reduction in an aperture ratio (AR) with respect to the previously-recorded address signals. Thus, even after the recording of the test signals, the previously-recorded address signals can be correctly reproduced from the disc-shaped recording medium.

In this invention, during a stepwise change of the recording laser power from a lowest level to a highest level in test recording, the recording power of an applied laser beam is set to a prescribed level equal or close to a reference level for each of spaced time intervals corresponding to portions of a disc-shaped recording medium on which address signals are previously recorded respectively. Therefore, the recording of test signals on the disc-shaped recording medium prevents the occurrence of a reduction in an aperture ratio (AR) with respect to the previously-recorded address signals. Thus, after the recording of the test signals, it is easy to properly set a signal detection level with respect to the previously-recorded address signals. Accordingly, the previously-recorded address signals can be correctly reproduced from the disc-shaped recording medium. In addition, it is possible to prevent a reproduced RF signal from being erroneously concluded to be absent.

In this invention, test recording can be implemented regardless of the position of a test recording area in a data area of a disc-shaped recording medium. This invention can be applied to a drive apparatus designed to record and reproduce an information signal on and from a data area in an optical disc while driving and scanning the optical disc at a high constant linear velocity changed among different values.

DETAILED DESCRIPTION OF THE INVENTION

Prior-art technologies will be explained below for a better understanding of this invention.

A DVD-R (a digital versatile disc recordable) and a DVD-RW (a digital versatile disc rewritable) are examples of a disc-shaped recording medium or an optical disc. An information signal to be recorded on a DVD-R or a DVD-RW is divided into ECC (error correcting code) blocks. The ECC blocks are sequentially recorded on the DVD-R or the DVD-RW.

Generally, every ECC block has data to be recorded which is formed by a corresponding piece of the information signal. Every ECC block also has an ECC signal for correcting errors in the data therein. Thus, one ECC block is a recording unit for the correction of errors in data therein.

Figure 1:
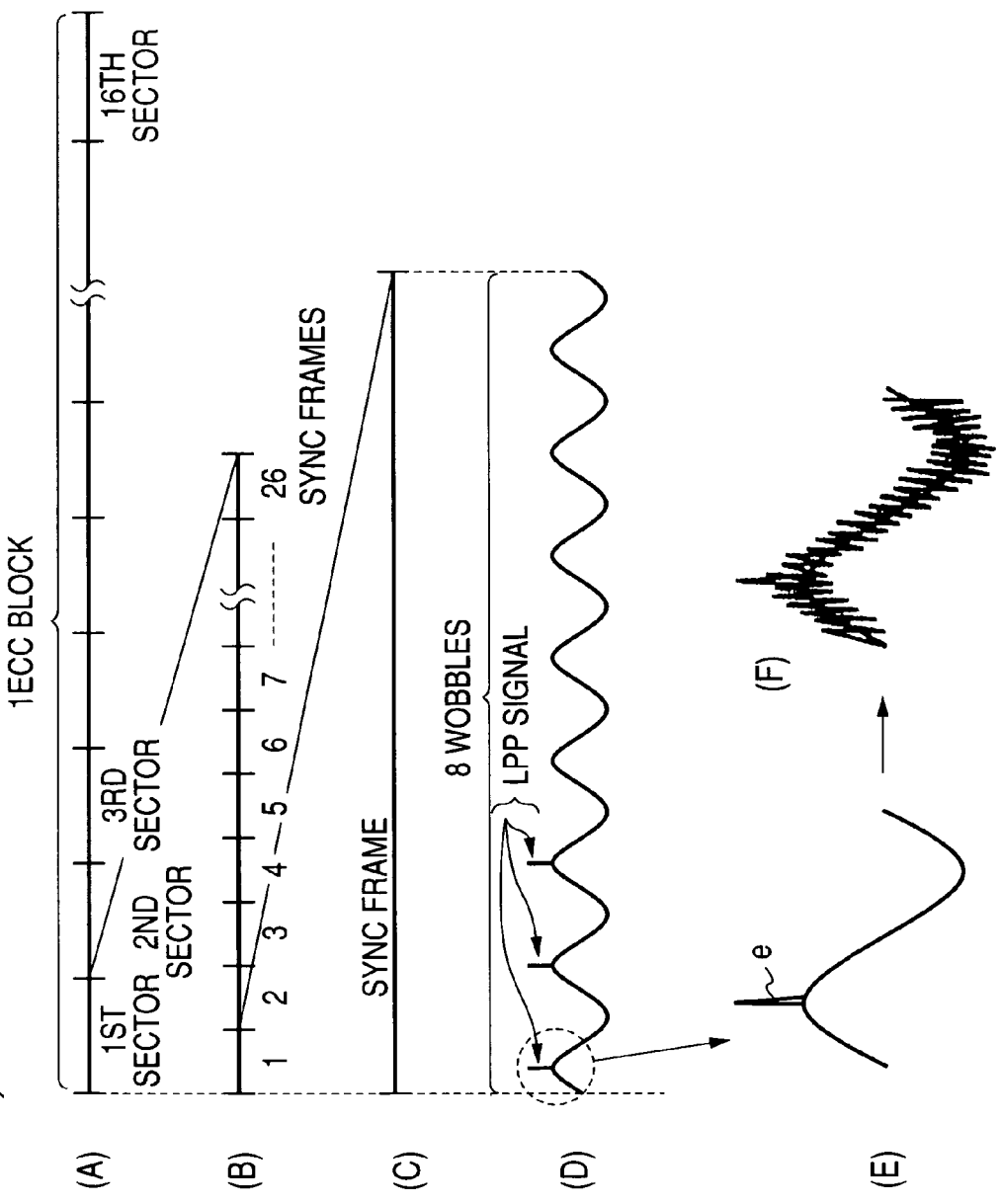
FIG. 1 is a time-domain diagram of the prior-art structure of data recorded on an optical disc and a reproduced signal representing prior-art signals previously recorded on the optical disc.

As shown in the portion (A) of FIG. 1, one ECC block is composed of 16 sequentially-arranged sectors. As shown in the portions (A) and (B) of FIG. 1, one sector is composed of 26 sequentially-arranged sync frames. As shown in the portions (C) and (D) of FIG. 1, one sync frame is assigned to 8 wobbles each corresponding to a 1-cycle sinusoidal wave. The wobbles are portions of a wobble signal.

During the manufacture of the DVD-R or the DVD-RW, a wobble signal and land pre-pit (LPP) address signals are recorded on the disc. The wobble signal is continuously provided in a track-corresponding groove in the disc. The wobble signal is formed by meanders of the track which include radial-direction positional variations at a constant spatial frequency. The LPP address signals are formed by pre-pits in land portions between neighboring portions of the groove which are spaced in a radial direction of the disc. The land pre-pits are separated into groups corresponding to respective LPP address signals and spaced in the direction of the track. Each group has a prescribed number of land pre-pits in proximity to each other. Each LPP address signal is assigned to a prescribed recording unit for an information signal to be recorded.

Each LPP address signal has 3 bits. As shown in the portion (D) of FIG. 1, one LPP address signal is located so as to be synchronized with the first 3 wobbles for one sync frame. The 3 bits composing one LPP address signal are assigned to the first 3 wobbles for one sync frame, respectively. As shown in the portions (D) and (E) of FIG. 1, the first bit among the 3 bits composing one LPP address signal represents a sync signal "e" superimposed on the front one (the first one) of the 8 wobbles for one sync frame. The second and third bits among the 3 bits composing one LPP address signal represent an address information piece or another information piece superimposed on the second and third ones of the 8 wobbles for one sync frame.

Thus, a 3-bit LPP address signal is assigned to one sync frame. There are 416 (26 by 16) LPP address signals for one ECC block. Accordingly, address-based information or other information having 156 bytes (3 by 26 by 16=1,248 bits) is represented by LPP address signals for one ECC block.

The DVD-R or the DVD-RW has a data area for storing an information signal (data). A major portion of the groove extends in the data area. As previously mentioned, the LPP address signals are formed by pre-pits in land portions between neighboring portions of the groove which are spaced in a radial direction of the disc. In the case where no data is recorded in the groove in the data area, the LPP address signals are reproduced from the data area at a high signal-to-noise ratio as amplitude signals superimposed on the reproduced wobble signal during the playback of the disc (see the portion (E) of FIG. 1). On the other hand, in the case where data is recorded in the groove in the data area, an RF signal indicating the data is also superimposed on the reproduced wobble signal and hence the LPP address signals are reproduced from the data area at a low signal-to-noise ratio as amplitude signals superimposed on the reproduced wobble signal during the playback of the disc (see the portion (F) of FIG. 1). Thus, in this case, the amplitude-direction margin for the detection of the LPP address signals is relatively small.

Figure 2:
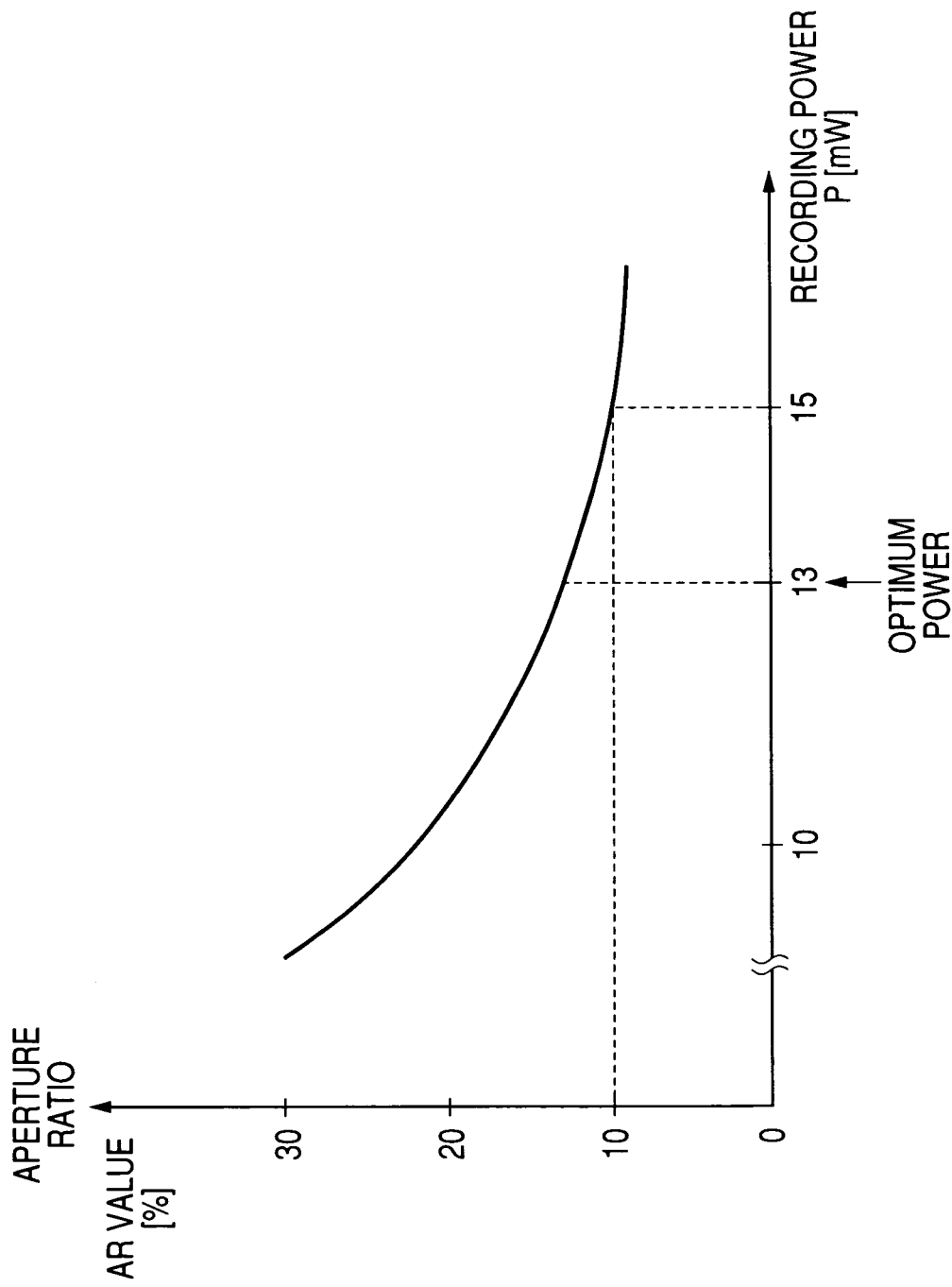
FIG. 2 is a diagram of the prior-art relation between an aperture ratio and a recording laser power.

The detection of the LPP address signal is implemented by comparing the reproduced waveform with a slice level decided by a window corresponding to an aperture ratio (AR). With reference to FIG. 2, the AR decreases as the recording laser power increases. When the recording laser power is lower than the optimum level (for example, 13 mW), the AR is relatively great so that the LPP address signals can easily be detected. On the other hand, when the recording laser power exceeds the optimum level, the AR is relatively small so that the detection of the LPP address signals is difficult.

Address-based information or other information is represented by a set of 3-bit LPP address signals which are distributed in each disc portion assigned to one ECC block. The head sync bit among the 3 bits composing one LPP address signal is important. An LPP address signal assigned to a former sync frame in every ECC block serves as an indicator of timing information, and is thus important. Accordingly, it is desirable to accurately detect the head sync bit among the 3 bits composing one LPP address signal, and an LPP address signal assigned to a former sync frame in every ECC block.

The detected LPP address signals are used to decide on-disc addresses in which data should be recorded. The recording of data on the disc is started in response to the decided on-disc addresses. In the event that LPP address signals fail to be detected, it is difficult to properly record data on the disc. When the detection of LPP address signals goes wrong, it is necessary to halt the recording of data on the disc.

A conventional drive apparatus for a recordable optical disc (a DVD-R or a DVD-RW) is designed to subject a laser beam to optimum power control (OPC). The conventional drive apparatus implements test recording and reproduction before main-data recording. During the test recording and reproduction, the conventional drive apparatus records a test signal plural times on a test area of the optical disc while decreasing stepwise the recording power of the laser beam from the upper limit to the lower limit of a given range where an optimum recording power level is expected to exist. Consequently, there are recorded test signals on the optical disc which correspond to the different values of the recording power of the laser beam, respectively. The recorded test signals are reproduced from the test area of the optical disc. The asymmetry values (the β values), the jitter values, the error rates, or the modulation degrees of the reproduced test signals are measured, and the reproduced test signals are evaluated from the measurement results. The best one of the reproduced test signals is selected in accordance with the evaluation results. Then, the value of the recording power of the laser beam which corresponds to the selected reproduced test signal is designated as an optimum level of the recording power of the laser beam. During the main-data recording which follows the test recording and reproduction, the conventional drive apparatus carries out the recording of main data on a data area of the optical disc while controlling the recording power of the laser beam at the optimum level. In this way, the OPC is carried out.

During the test recording and reproduction, the conventional drive apparatus repetitively modulates the laser beam in accordance with the test signal to be recorded, and the modulated laser beam forms recording marks in the groove of the optical disc. As the recording power of the laser beam applied to the optical disc is raised, the size of recording marks formed in the groove increases. During a former stage in the test recording and reproduction, the recording power of the laser beam is generally increased above the optimum level. When the recording power of the laser beam is raised above a particular value, some of formed recording marks reach land pre-pits (LPP). It is difficult to correctly reproduce the LPP address signals from an optical disc in such a condition since land pre-pits (LPP) are hardly discriminated from recording marks. Thus, in this case, there occurs the problem that the LPP address signals can not be correctly reproduced from the optical disc.

In the conventional drive apparatus, during a former stage in the test recording and reproduction, the recording power of the laser beam is higher than the optimum level. The higher recording power results in a lower AR (aperture ratio). The lower AR may cause the following problem. After main data is recorded over the data area of the optical disc, finalization is required to be implemented on a disc portion including the test area. The finalization includes a step of signal recording in response to LPP address signals reproduced from the test area. The lower AR makes it difficult to reproduce the LPP address signals from the test area of the optical disc. In the event that the LPP address signals actually fail to be reproduced, the finalization can not be completed since the step of signal recording which is included in the finalization is difficult to implement. Thus, in this case, all the recorded main data is overridden or invalidated.

First Embodiment

Figure 3:
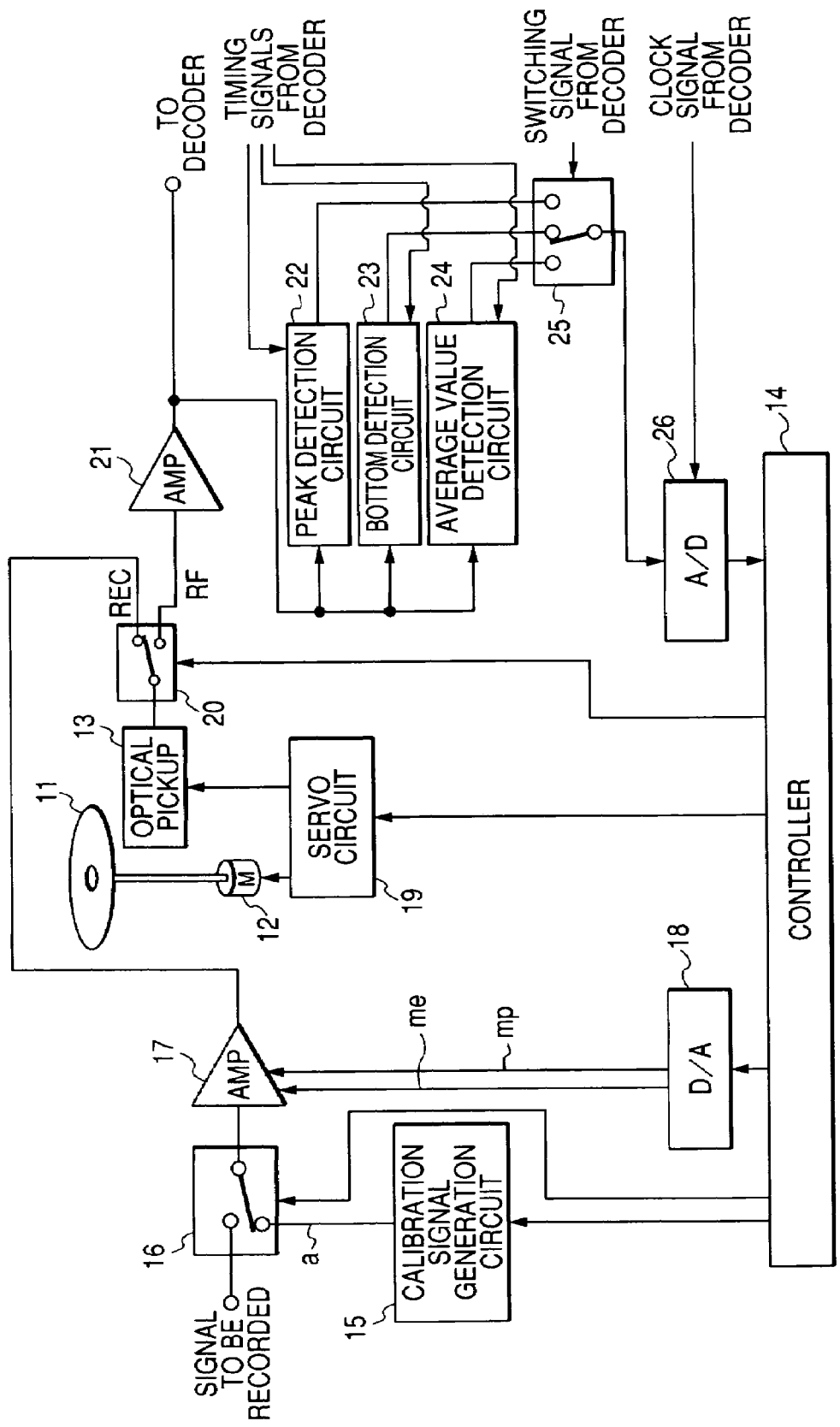
FIG. 3 is a block diagram of a drive apparatus for an optical disc according to a first embodiment of this invention.

FIG. 3 shows a drive apparatus for an optical disc 11 according to a first embodiment of this invention. The drive apparatus in FIG. 3 includes an apparatus for controlling a recording laser power in this invention. The drive apparatus in FIG. 3 implements a method of controlling a recording laser power in this invention. Typical examples of the optical disc 11 are a DVD-R (a digital versatile disc recordable) and a DVD-RW (a digital versatile disc rewritable).

The drive apparatus in FIG. 3 operates in a mode selected from different modes including a test recording mode, a test reproducing mode, a normal recording mode, and a normal reproducing mode. As shown in FIG. 3, the drive apparatus includes a spindle motor 12 and an optical pickup 13. In operation of the drive apparatus, the spindle motor 12 rotates the optical disc 11 while the optical pickup 13 applies a laser beam to the optical disc 11. The rotation of the output shaft of the spindle motor 12, that is, the rotation of the optical disc 11, is controlled by a servo circuit 19 so that the optical disc 11 will be scanned by the laser beam at a constant linear velocity (CLV). Accordingly, the rotation of the optical disc 11 is controlled on a CLV basis.

The optical pickup 13 is movable relative to the optical disc 11 in a radial direction with respect to the optical disc 11. The optical pickup 13 includes a laser diode for emitting the laser beam toward the optical disc 11. In operation of the drive apparatus, the optical pickup 13 is controlled by the servo circuit 19 so that the laser beam will follow a track on the optical disc 11 during the rotation of the optical disc 11. The operation of the servo circuit 19 is controlled by a controller 14.

During the test recording mode of operation, a calibration signal generation circuit 15 is controlled by the controller 14 to repetitively generate a calibration signal (a test signal) "a". The calibration signal generation circuit 15 outputs the generated calibration signal "a" to a switch 16. The switch 16 is controlled by the controller 14 to pass the calibration signal "a" to a recording amplifier 17.

The controller 14 includes a microcomputer or a similar programmable signal processing device having a combination of an input/output port, a processing section, a ROM or an EEPROM, and a RAM. The controller 14 operates in accordance with a program stored in the ROM or the EEPROM. The program is designed to enable the controller 14 to execute the previously-indicated operation steps and also later-indicated operation steps.

The calibration signal generation circuit 15 may be omitted from the drive apparatus in FIG. 3. In this case, the controller 14 is designed as follows. The ROM or the EEPROM in the controller 14 stores data representing a pattern being the calibration signal "a". The controller 14 reads out the pattern data from the ROM or the EEPROM, and outputs the read-out pattern data to a D/A converter (not shown). The D/A converter changes the pattern data into the calibration signal "a", and outputs the calibration signal "a" to the recording amplifier 17.

During the test recording mode of operation, the recording amplifier 17 enlarges the calibration signal "a", and outputs the enlarged calibration signal "a" to a switch 20. The switch 20 is controlled by the controller 14 to pass the calibration signal "a" to the laser diode in the optical pickup 13. The laser diode is driven in response to the calibration signal "a" so that the laser beam emitted by the laser diode will be modulated in accordance with the calibration signal "a". The power of the laser beam depends on the amplitude of the calibration signal "a".

The ROM or the EEPROM in the controller 14 stores power control data. The controller 14 transfers the power control data from the ROM or the EEPROM to a D/A converter 18. The D/A converter 18 changes the power control data into a recording laser power control signal "mp" and an erasing laser power control signal "me". The D/A converter 18 outputs the recording laser power control signal "mp" and the erasing laser power control signal "me" to the recording amplifier 17. The gain of the recording amplifier 17 is varied in response to the recording laser power control signal "mp" and the erasing laser power control signal "me". Thus, the amplitude of the enlarged calibration signal "a" is changed in response to the recording laser power control signal "mp" and the erasing laser power control signal "me". The recording power of the laser beam is decided by the recording laser power control signal "mp". The erasing power of the laser beam is decided by the erasing laser power control signal "me".

During the test recording mode of operation, the radial position of the optical pickup 13 relative to the optical disc 11 is controlled by the servo circuit 19 so that the laser beam emitted from the laser diode in the optical pickup 13 will scan a prescribed area (a test recording area) in the optical disc 11 and record the calibration signal "a" thereon.

The test reproducing mode of operation is started after the test recording mode of operation is completed. During the test reproducing mode of operation, the laser diode in the optical pickup 13 emits the laser beam at a constant reproducing power level. The radial position of the optical pickup 13 relative to the optical disc 11 is controlled by the servo circuit 19 so that the laser beam emitted from the laser diode in the optical pickup 13 will scan the prescribed area (the test recording area) in the optical disc 11 and the optical pickup 13 will receive the laser beam returned from the prescribed area in the optical disc 11. The returned laser beam contains the calibration signal "a", a wobble signal, and an address signal (an LPP address signal) reproduced from the optical disc 11. The optical pickup 13 converts the received laser beam into an RF signal containing the reproduced calibration signal "a", the reproduced wobble signal, and the reproduced address signal. The optical pickup 13 outputs the RF signal to the switch 20.

During the test reproducing mode of operation, the switch 20 is controlled by the controller 14 to pass the RF signal to a reproducing amplifier 21. The reproducing amplifier 21 enlarges the RF signal, and outputs the enlarged RF signal to a decoder (not shown), a peak detection circuit 22, a bottom detection circuit 23, and an average value detection circuit 24.

The decoder recovers the wobble signal and the address signal from the RF signal. The decoder generates timing signals for the peak detection circuit 22, the bottom detection circuit 23, and the average value detection circuit 24 in response to the recovered wobble signal and the recovered address signal. The decoder outputs the generated timing signals to the peak detection circuit 22, the bottom detection circuit 23, and the average value detection circuit 24 respectively. Furthermore, the decoder generates a switching signal in response to the recovered wobble signal and the recovered address signal. The decoder outputs the generated switching signal to a switch 25. In addition, the decoder generates a clock signal from the recovered wobble signal. The decoder outputs the generated clock signal to an A/D converter 26.

Each of the peak detection circuit 22, the bottom detection circuit 23, the average value detection circuit 24 includes a sample-and-hold circuit. The peak detection circuit 22 periodically samples and holds a peak level of the RF signal in response to the related timing signal outputted from the decoder. The peak detection circuit 22 outputs the peak level signal to the switch 25. The bottom detection circuit 23 periodically samples and holds a bottom level of the RF signal in response to the related timing signal outputted from the decoder. The bottom detection circuit 23 outputs the bottom level signal to the switch 25. The average value detection circuit 24 periodically samples and holds an average level of the RF signal in response to the related timing signal outputted from the decoder. The average value detection circuit 24 outputs the average level signal to the switch 25.

The switch 25 sequentially and cyclically selects one among the peak level signal, the bottom level signal, and the average level signal in a prescribed order in response to the switching signal outputted from the decoder, thereby multiplexing the peak level signal, the bottom level signal, and the average level signal on a time sharing basis. The switch 25 outputs the resultant multiplexed signal to the A/D converter 26. The A/D converter 26 changes the multiplexed signal into a corresponding digital signal in response to the clock signal outputted from the decoder. The A/D converter 26 outputs the digital signal to the controller 14. The controller 14 uses the digital signal for deciding an optimum recording power value of the laser beam applied to the optical disc 11.

The calibration signal (the test signal) "a" includes an 11T signal and a 3T signal. Accordingly, during the test reproducing mode of operation, the RF signal outputted from the reproducing amplifier 21 also includes an 11T signal and a 3T signal. The peak level signal generated by the peak detection circuit 22 corresponds to the peak level provided by the 11T signal in the RF signal. The bottom level signal generated by the bottom detection circuit 23 corresponds to the bottom level provided by the 11T signal in the RF signal. The average value detection circuit 24 includes an averaging circuit having a low pass filter for averaging (or smoothing) the 3T signal in the RF signal. The average level signal generated by the average value detection circuit 24 corresponds to the result of the averaging of the 3T signal. The averaging circuit in the average value detection circuit 24 can be tuned to average one of a 3T signal, a 4T signal, and a 5T signal in accordance with the setting of the frequency response of the low pass filter therein.

Figure 4:
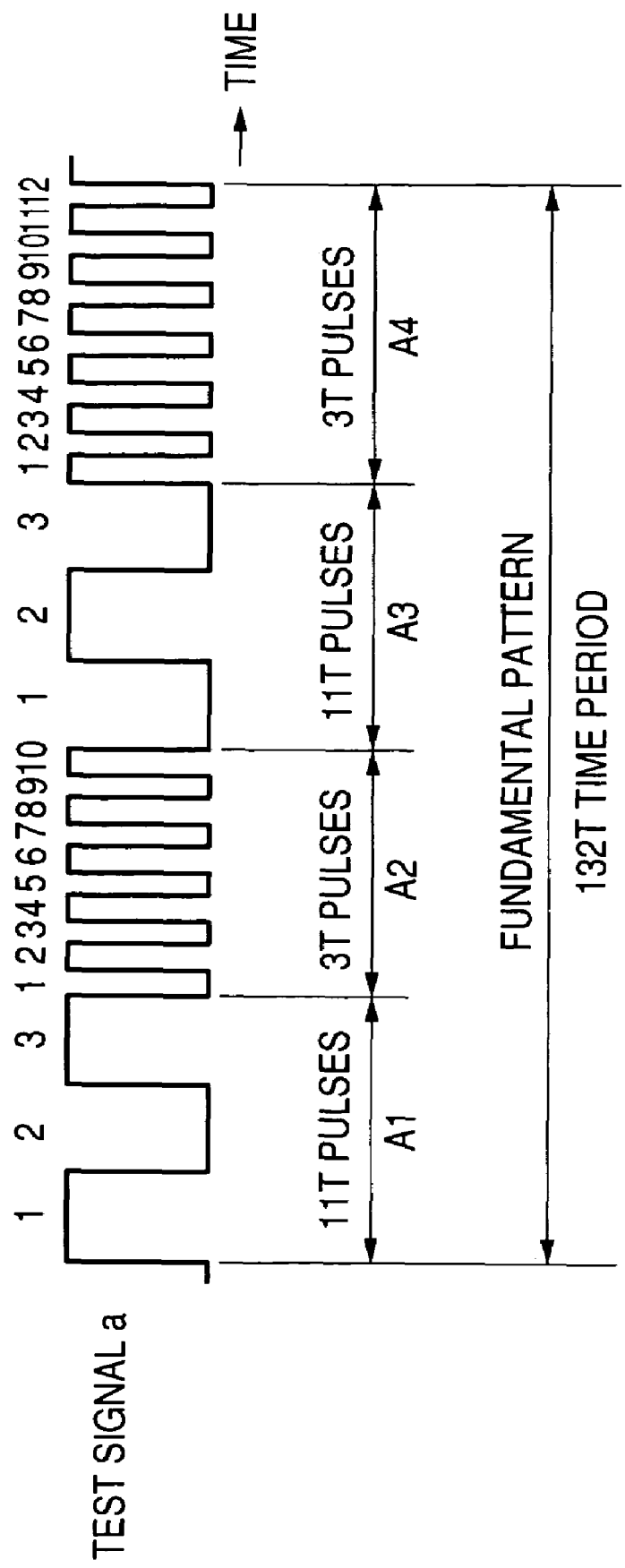
FIG. 4 is a time-domain diagram of the waveform of a calibration signal (a test signal).

The calibration signal (the test signal) "a" will be further explained below. Preferably, the calibration signal has a recurrence of a fundamental pattern. As shown in FIG. 4, the fundamental pattern has a time period (a time length) equal to 132T where T denotes a bit period. The fundamental pattern is divided into first, second, third, and fourth intervals A1, A2, A3, and A4 sequentially arranged in that order. The first and third intervals A1 and A3 are equal in time length to 33T. The second interval A2 is equal in time length to 30T. The fourth interval A4 is equal in time length to 36T. The first and third intervals A1 and A3 are occupied by 11T pulses composing 11T signals. The second and fourth intervals A2 and A4 are occupied by 3T pulses composing 3T signals.

Specifically, during the first interval A1, the calibration signal "a" remains at a high level for 11T and then remains at a low level for 11T, and then remains again at the high level for 11T. During the second interval A2, the calibration signal "a" remains at the low level for 3T and then remains at the high level for 3T, and then repeats this level change four more times. During the third interval A3, the calibration signal "a" remains at the low level for 11T and then remains at the high level for 11T, and then remains again at the low level for 11T. During the fourth interval A4, the calibration signal "a" remains at the high level for 3T and then remains at the low level for 3T, and then repeats this level change five more times.

Consequently, in the fundamental pattern, the sum of the time lengths of the 11T high-level pulses is equal to 33T (=11T×3). The sum of the time lengths of the 11T low-level pulses is equal to 33T (=11T×3). The sum of the time lengths of the 3T high-level pulses is equal to 33T (=3T×11). The sum of the time lengths of the 3T low-level pulses is equal to 33T (=3T×11). Thus, in the fundamental pattern, the sum of the time lengths of the 11T and 3T high-level pulses is equal to the sum of the time lengths of the 11T and 3T low-level pulses. Accordingly, the fundamental pattern has a duty cycle of 50% at which the adverse effect of DC signal components hardly occurs.

Figure 5:
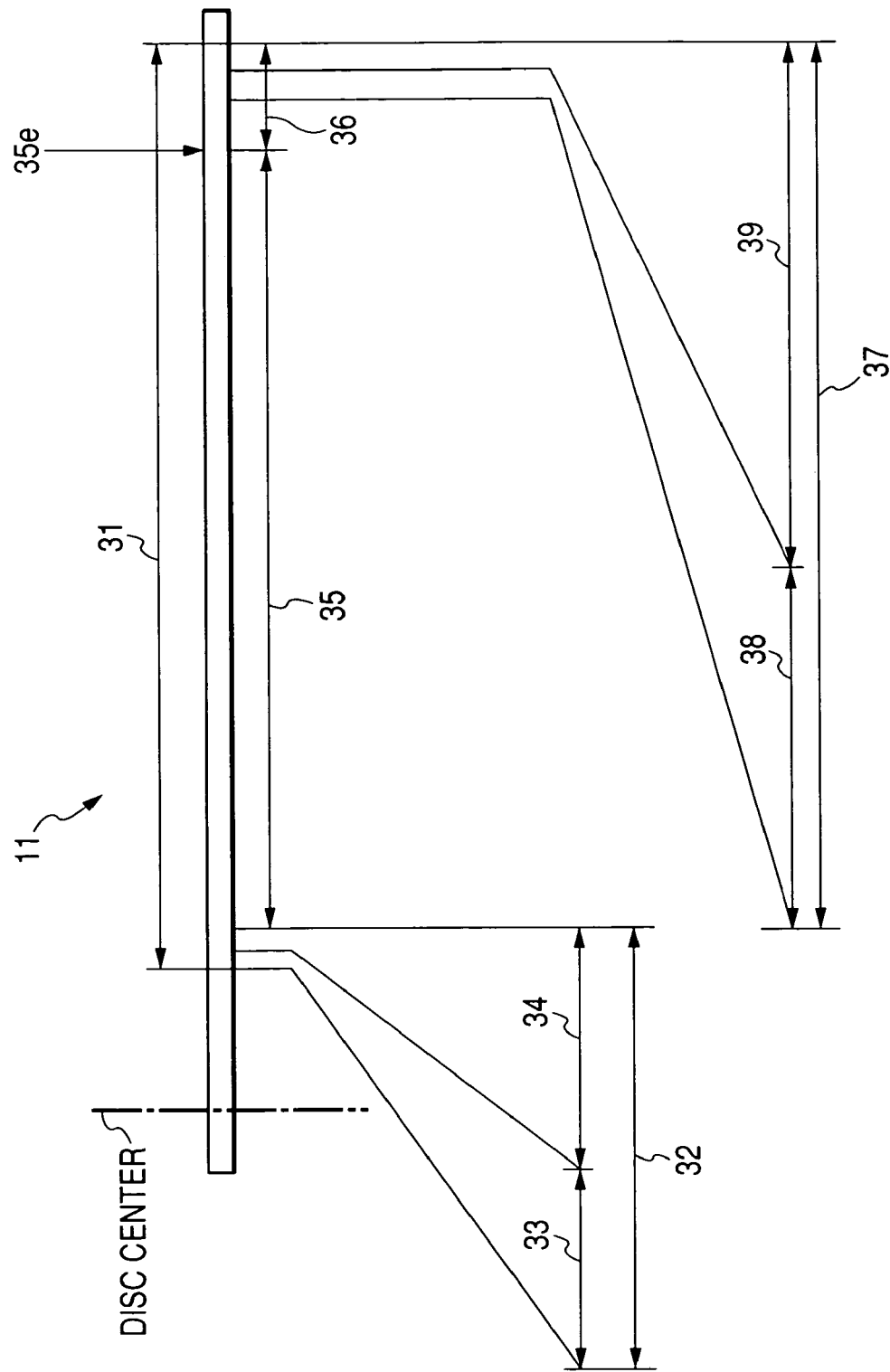
FIG. 5 is a sectional diagram of the optical disc in FIG. 3.

Preferably, the optical disc 11 is designed to be scanned by a laser beam at a constant linear velocity (CLV). As shown in FIG. 5, the optical disc 11 has an information area 31 which basically conforms with the known optical disc standards such as the DVD-R standards or the DVD-RW standards.

An inner portion of the information area 31 includes a lead-in area 32. The lead-in area 32 is composed of an inner power calibration area (an inner PCA) 33 and a recording management data area (an RMD area) 34. The RMD area 34 extends outward of the inner power calibration area 33. The inner power calibration area 33 is also referred to as the inner test recording area 33.

The information area 31 includes a data area 35 extending adjacently outward of the lead-in area 32. In general, the data area 35 is used to store general data (general information). The data area 35 has prescribed portions for test recording and reproduction which are referred to as test zones or data-area test zones. A possible outermost position 35e is given for the data area 35. The information area 31 further includes a reserved area or a surplus area 36 extending adjacently outward of the possible outermost position 35e for the data area 35. The surplus area 36 includes a lead-out area 37. The lead-out area 37 is composed of an outer power calibration area (an outer PCA) 38 and a lead-out signal recording area 39. The lead-out signal recording area 39 extends outward of the outer power calibration area 38. The outer power calibration area 38 is also referred to as the outer test recording area 38.

The inner PCA (inner test recording area) 33, the outer PCA (outer test recording area) 38, and the data-area test zones are subjected to test recording and reproduction for optimum power control (OPC). Basically, one test recording and reproduction procedure is composed of one test recording procedure and one test reproduction procedure.

During one test recording procedure, a test signal "a" whose quantity is equal to a predetermined value such as one sync frame is recorded on the inner PCA 33, the outer PCA 38, or one of the data-area test zones twenty-six times while the recording power of the laser beam is sequentially changed among twenty-six predetermined different levels on an increasing stepwise basis. Thus, one test recording procedure is composed of twenty-six stages each assigned to the once recording of a 1-sync-frame-corresponding test signal "a" and one recording power level of the laser beam.

The inner PCA 33 has a capacity corresponding to 100 test recording procedures or 2,600 sync frames. The outer PCA 38 has a capacity corresponding to 400 test recording procedures or 10,400 sync frames.

Before a new test recording and reproduction procedure is started, recording address information about the inner PCA 33, the outer PCA 38, or one of the data-area test zones is read out from the RMD area 34. The read-out recording address information is used to detect the boundary within the inner PCA 33, the outer PCA 38, or one of the data-area test zones between a usable portion and a used portion occupied by test signals recorded by the last and previous test recording and reproduction procedures. The detected boundary is used to decide a position within the inner PCA 33, the outer PCA 38, or one of the data-area test zones from which the recording of a test signal should be started during the new test recording and reproduction procedure.

The information area 31 has a track (a pre-groove) extending over the whole thereof. Land pre-pit information (LPP information) is recorded on wobbles of the track as address information. The LPP information represents a value (an address value) indicative of the address of a related point in the optical disc 11. At the starting position of the data area 35, that is, at the inner edge of the data area 35, the address value represented by the LPP information is equal to a predetermined reference value. The address value represented by the LPP information monotonically increases from the predetermined reference value as the related point in the information area 31 moves from the starting position of the data area 35 to the outer edge of the information area 31. The address value represented by the LPP information monotonically decreases from the predetermined reference value as the related point in the information area 31 moves from the starting position of the data area 35 to the inner edge of the information area 31. The address value represented by the LPP information may monotonically decrease from the predetermined reference value as the related point in the information area 31 moves from the starting position of the data area 35 to the outer edge of the information area 31. In this case, the address value represented by the LPP information monotonically increases from the predetermined reference value as the related point in the information area 31 moves from the starting position of the data area 35 to the inner edge of the information area 31.

The RMD area 34 stores at least one of the following information pieces (a), (b), (c), (d), and (e) composing RMD information:

(a) an information piece representing addresses of a portion of the inner PCA 33 which has been used or occupied, an information piece representing addresses of a portion of the outer PCA 38 which has been used or occupied, and an information piece representing addresses of a portion of each of the data-area test zones which has been used or occupied;

(b) an information piece representing at least one integral multiple of the standard linear velocity which is equal to a linear velocity at which test recording and reproduction have been carried out, an information piece representing the results of the evaluation of reproduced test signals (for example, an information piece representing the jitter values, the error rates, and the modulation degrees of the reproduced test signals);

(c) an information piece representing which of the inner PCA 33, the outer PCA 38, and the data-area test zones has been used by test recording and reproduction;

(d) an information piece representing recording conditions including at least one optimum recording power of the laser beam, at least one optimum erasing power of the laser beam, the type of the recording strategy (the recording laser beam waveform), at least one optimum parameter for the recording strategy, and the date (year, month, day, and time) of related test recording and reproduction, an information piece representing environmental conditions including a disc temperature, a disc vibration, and a disc surface vibration, and an information piece representing the name of the manufacturer of the optical disc 11; and (e) an information piece representing items of a recording apparatus (a drive apparatus) such as the name of the manufacturer of the recording apparatus, the ID number of the recording apparatus, the lot number of the recording apparatus, and the serial number of the recording apparatus.

Preferably, the RMD area 34 has an address management section which stores the information piece representing the addresses of the portion of the inner PCA 33 which has been used or occupied, the information piece representing the addresses of the portion of the outer PCA 38 which has been used or occupied, and the information piece representing the addresses of the portion of each of the data-area test zones which has been used or occupied. These address-related information pieces can be used for management of the inner PCA 33, the outer PCA 38, and the data-area test zones. Thus, these address-related information pieces are also referred to as the PCA management information pieces.

Preferably, the RMD area 34 has a recording condition information area which stores the information piece representing recording conditions including at least one optimum recording power of the laser beam, at least one optimum erasing power of the laser beam, the type of the recording strategy (the recording laser beam waveform), at least one optimum parameter for the recording strategy, and the date (year, month, day, and time) of related test recording and reproduction.

During the normal recording mode of operation, an information signal to be recorded is fed to the switch 16. The switch 16 is controlled by the controller 14 to pass the information signal to the recording amplifier 17. The recording amplifier 17 enlarges the information signal at a gain corresponding to the optimum recording power of the laser beam which is notified from the controller 14 via the D/A converter 18. The recording amplifier 17 outputs the enlarged information signal to the switch 20. The switch 20 is controlled by the controller 14 to pass the information signal to the laser diode in the optical pickup 13. The laser diode is driven in response to the information signal so that the laser beam emitted by the laser diode will be modulated in accordance with the information signal. The power of the laser beam depends on the amplitude of the information signal. The radial position of the optical pickup 13 relative to the optical disc 11 is controlled by the servo circuit 19 so that the laser beam emitted from the laser diode in the optical pickup 13 will scan the data area 35 in the optical disc 11 and record the information signal thereon.

During the test recording mode of operation, the test reproducing mode of operation, the normal recording mode of operation, and the normal reproducing mode of operation, the optical pickup 13 applies the laser beam to the optical disc 11 while receiving a laser beam returned therefrom. The returned laser beam contains a wobble signal and an address signal (an LPP address signal) reproduced from the optical disc 11. The optical pickup 13 converts the received laser beam into an RF signal containing the reproduced wobble signal and the reproduced address signal. The optical pickup 13 feeds the RF signal to the servo circuit 19. The servo circuit 19 extracts the reproduced wobble signal and the reproduced address signal from the RF signal. The servo circuit 19 uses the reproduced wobble signal for the control of the rotational speed of the output shaft of the spindle motor 12. The servo circuit 19 uses the reproduced address signal for the control of the radial position of the optical pickup 13 relative to the optical disc 11.

During the test recording mode of operation and the normal recording mode of operation, the rotation of the optical disc 11 is controlled on a CLV basis. Specifically, the CLV control is implemented as follows. The controller 14 notifies the servo circuit 19 of a setting integral multiple (a desired integral multiple) of the standard linear velocity at which the optical disc 11 should be scanned by the laser beam. The servo circuit 19 drives the spindle motor 12 in response to the desired integral multiple of the standard linear velocity and the reproduced wobble signal to harmonize the reproduced wobble signal with the desired integral multiple of the standard linear velocity. During the test reproducing mode of operation and the normal reproducing mode of operation, the rotation of the optical disc 11 may be similarly controlled on a CLV basis.

Figure 6:
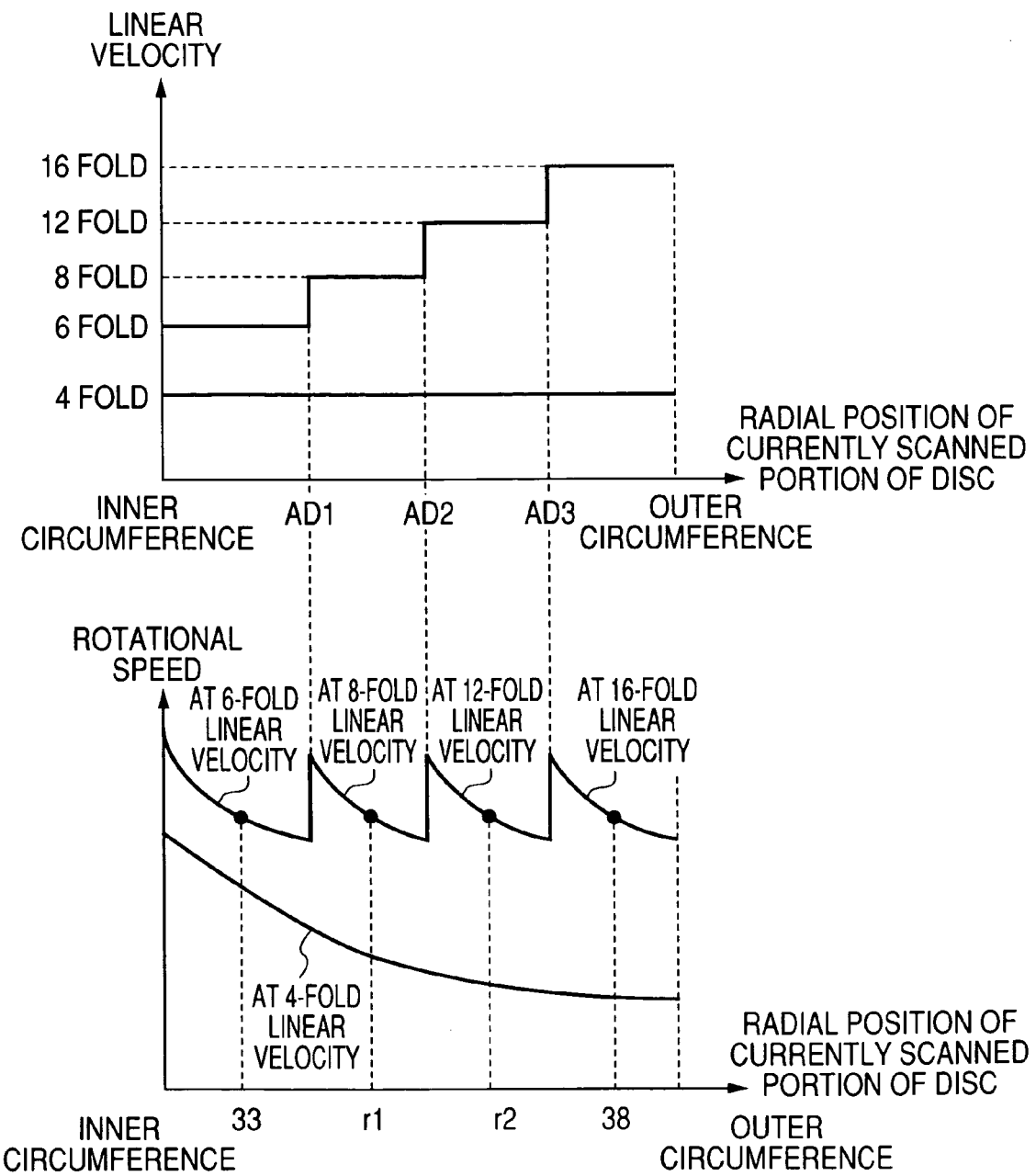
FIG. 6 is a diagram of the relation among the radial position of a currently scanned portion of an optical disc, the linear velocity at which the optical disc is scanned by a laser beam, and the rotational speed of the optical disc (the rotational speed of the output shaft of a spindle motor).

As shown in FIG. 6, there are first, second, and third predetermined reference positions or addresses AD1, AD2, and AD3 for the radial position of the currently scanned portion of the optical disc 11. The first, second, and third predetermined reference addresses AD1, AD2, and AD3 are sequentially arranged in that order as viewed along a radially outward direction with respect to the optical disc 11. The first, second, and third predetermined reference addresses AD1, AD2, and AD3 exist in the data area 35 of the optical disc 11.

When the radial position of the currently scanned portion of the optical disc 11 is between the inner circumferential edge of the information area 31 (that is, the inner circumferential edge of the inner PCA 33) and the first predetermined reference address AD1, the linear velocity of the optical disc 11 relative to the laser beam is controlled at a 6-fold value which means a linear velocity equal to 6 times the standard value. In this case, the rotational speed of the optical disc 11 (the rotational speed of the output shaft of the spindle motor 12) is monotonically decreased as the radial position of the currently scanned portion of the optical disc 11 moves from the inner circumferential edge of the information area 31 to the first predetermined reference address AD1. When the radial position of the currently scanned portion of the optical disc 11 reaches the first predetermined reference address AD1, the linear velocity of the optical disc 11 relative to the laser beam is increased from the 6-fold value to an 8-fold value and is then controlled at the 8-fold value. At the same time, the rotational speed of the optical disc 11 (the rotational speed of the output shaft of the spindle motor 12) is increased accordingly. When the radial position of the currently scanned portion of the optical disc 11 is between the first predetermined reference address AD1 and the second predetermined reference address AD2, the linear velocity of the optical disc 11 relative to the laser beam remains controlled at the 8-fold value. In this case, the rotational speed of the optical disc 11 (the rotational speed of the output shaft of the spindle motor 12) is monotonically decreased as the radial position of the currently scanned portion of the optical disc 11 moves from the first predetermined reference address AD1 to the second predetermined reference address AD2. When the radial position of the currently scanned portion of the optical disc 11 reaches the second predetermined reference address AD2, the linear velocity of the optical disc 11 relative to the laser beam is increased from the 8-fold value to a 12-fold value and is then controlled at the 12-fold value. At the same time, the rotational speed of the optical disc 11 (the rotational speed of the output shaft of the spindle motor 12) is increased accordingly. When the radial position of the currently scanned portion of the optical disc 11 is between the second predetermined reference address AD2 and the third predetermined reference address AD3, the linear velocity of the optical disc 11 relative to the laser beam remains controlled at the 12-fold value. In this case, the rotational speed of the optical disc 11 (the rotational speed of the output shaft of the spindle motor 12) is monotonically decreased as the radial position of the currently scanned portion of the optical disc 11 moves from the second predetermined reference address AD2 to the third predetermined reference address AD3. When the radial position of the currently scanned portion of the optical disc 11 reaches the third predetermined reference address AD3, the linear velocity of the optical disc 11 relative to the laser beam is increased from the 12-fold value to a 16-fold value and is then controlled at the 16-fold value. At the same time, the rotational speed of the optical disc 11 (the rotational speed of the output shaft of the spindle motor 12) is increased accordingly. When the radial position of the currently scanned portion of the optical disc 11 is between the third predetermined reference address AD3 and the outer circumferential edge of the information area 31 (that is, the outer circumferential edge of the lead-out signal recording area 39), the linear velocity of the optical disc 11 relative to the laser beam remains controlled at the 16-fold value. In this case, the rotational speed of the optical disc 11 (the rotational speed of the output shaft of the spindle motor 12) is monotonically decreased as the radial position of the currently scanned portion of the optical disc 11 moves from the third predetermined reference address AD3 to the outer circumferential edge of the information area 31.

Generally, the RMD area 34 in the optical disc 11 stores information pieces representing optimum recording power levels of the laser beam for the 6-fold, 8-fold, 12-fold, and 16-fold linear velocities respectively. Preferably, at an initial stage of the normal recording mode of operation or the test recording mode of operation, the drive apparatus accesses the RMD area 34 in the optical disc 11 to reproduce the information pieces representing the optimum recording power levels of the laser beam for the 6-fold, 8-fold, 12-fold, and 16-fold linear velocities respectively. During a later stage of the normal recording mode of operation or the test recording mode of operation, the actual recording power of the laser beam is controlled as follows. When the optical disc 11 is scanned by the laser beam at the 6-fold linear velocity, the actual recording power of the laser beam is controlled at the optimum level for the 6-fold linear velocity. When the optical disc 11 is scanned by the laser beam at the 8-fold linear velocity, the actual recording power of the laser beam is controlled at the optimum level for the 8-fold linear velocity. When the optical disc 11 is scanned by the laser beam at the 12-fold linear velocity, the actual recording power of the laser beam is controlled at the optimum level for the 12-fold linear velocity. When the optical disc 11 is scanned by the laser beam at the 16-fold linear velocity, the actual recording power of the laser beam is controlled at the optimum level for the 16-fold linear velocity.

The drive apparatus is of a stationary type or a portable type. Preferably, the drive apparatus of the stationary type is designed to implement CLV control which can be changed among a 6-fold speed state, an 8-fold speed state, a 12-fold speed state, and a 16-fold speed state as previously mentioned.

Preferably, the drive apparatus of the portable type is designed to implement CLV control continuously fixed at a 4-fold speed state. In this case, as shown in FIG. 6, the linear velocity of the optical disc 11 relative to the laser beam remains controlled at a 4-fold value independent of the radial position of the currently scanned portion of the optical disc 11. On the other hand, the rotational speed of the optical disc 11 (the rotational speed of the output shaft of the spindle motor 12) is monotonically decreased as the radial position of the currently scanned portion of the optical disc 11 moves from the inner circumferential edge of the information area 31 to the outer circumferential edge thereof. The 4-fold linear velocity is advantageous over the 6-fold, 8-fold, 12-fold, and 16-fold linear velocities in reducing the size of the spindle motor 12 or decreasing the rate of the heat generation from the spindle motor 12.

The drive apparatus of the stationary type implements test recording and reproduction to decide an optimum recording power level of the laser beam for each of the 6-fold, 8-fold, 12-fold, and 16-fold linear velocities. Specifically, when the optical disc 11 is scanned by the laser beam at the 6-fold linear velocity, test recording and reproduction are carried out by using the inner PCA 33 in the optical disc 11 (see FIG. 6). At this time, the optimum recording power level of the laser beam for the 6-fold linear velocity is decided on the basis of the results of the evaluation of the reproduced test signals. When the optical disc 11 is scanned by the laser beam at the 8-fold linear velocity, test recording and reproduction are carried out by using a prescribed portion r1 of the data area 35 in the optical disc 11 which extends between the first and second predetermined reference addresses AD1 and AD2 (see FIG. 6). At this time, the optimum recording power level of the laser beam for the 8-fold linear velocity is decided on the basis of the results of the evaluation of the reproduced test signals. The prescribed portion r1 of the data area 35 is one of the previously-indicated data-area test zones. When the optical disc 11 is scanned by the laser beam at the 12-fold linear velocity, test recording and reproduction are carried out by using a prescribed portion r2 of the data area 35 in the optical disc 11 which extends between the second and third predetermined reference addresses AD2 and AD3 (see FIG. 6). At this time, the optimum recording power level of the laser beam for the 12-fold linear velocity is decided on the basis of the results of the evaluation of the reproduced test signals. The prescribed portion r2 of the data area 35 is another of the previously-indicated data-area test zones. When the optical disc 11 is scanned by the laser beam at the 16-fold linear velocity, test recording and reproduction are carried out by using the outer PCA 38 in the optical disc 11 (see FIG. 6). At this time, the optimum recording power level of the laser beam for the 16-fold linear velocity is decided on the basis of the results of the evaluation of the reproduced test signals.

The drive apparatus of the portable type implements CLV recording at the 4-fold speed as previously mentioned. The drive apparatus of the portable type implements test recording and reproduction to decide an optimum recording power level of the laser beam for only the 4-fold linear velocity. Specifically, when the optical disc 11 is scanned by the laser beam at the 4-fold linear velocity, test recording and reproduction are carried out by basically using the inner PCA 33 or the outer PCA 38 in the optical disc 11. At this time, the optimum recording power level of the laser beam for the 4-fold linear velocity is decided on the basis of the results of the evaluation of the reproduced test signals. In general, the outer PCA 38 is lower in reliability than the inner PCA 33. Therefore, it is preferable to use only the inner PCA 33 for the test recording and reproduction. The inner PCA 33 has a limited capacity, and hence there occur conditions where the inner PCA 33 is fully used or occupied. When the inner PCA 33 falls into a fully-used state, further test recording and reproduction are carried out by using the outer PCA 38 or a portion of the data area 35.

The drive apparatus generates information pieces representing the optimum recording power levels of the laser beam for the 6-fold, 8-fold, 12-fold, and 16-fold linear velocities respectively which have been decided in the test recording and reproduction. Alternatively, the drive apparatus may generates an information piece representing the optimum recording power level of the laser beam for the 4-fold linear velocity which has been decided in the test recording and reproduction. For each of the decided optimum recording power levels of the laser beam, the drive apparatus generates an information piece representing which of the inner PCA 33, the outer PCA 38, and the data-area test zones r1 and r2 has been used by the test recording and reproduction, and an information piece representing the integral multiple of the standard linear velocity which is equal to the linear velocity at which the test recording and reproduction have been carried out. The drive apparatus further generates an information piece representing addresses of a portion of the inner PCA 33 which has been used or occupied, an information piece representing addresses of a portion of the outer PCA 38 which has been used or occupied, an information piece representing addresses of a portion of the data-area test zone r1 which has been used or occupied, and an information piece representing addresses of a portion of the data-area test zone r2 which has been used or occupied. The drive apparatus records the generated information pieces on the RMD area 34 in the optical disc 11 as portions of RMD information.

Preferably, the information piece representing the addresses of the portion of the inner PCA 33 which has been used or occupied, the information piece representing the addresses of the portion of the outer PCA 38 which has been used or occupied, the information piece representing the addresses of the portion of the data-area test zone r1 which has been used or occupied, and the information piece representing the addresses of the portion of the data-area test zone r2 which has been used or occupied are assigned to the address management section in the RMD area 34.

In addition, the drive apparatus generates an information piece representing the name of the manufacturer of the apparatus, the ID number of the apparatus, the lot number of the apparatus, and the serial number of the apparatus. The drive apparatus records the generated information piece on the RMD area 34 in the optical disc 11 as a portion of RMD information.

As previously mentioned, the controller 14 operates in accordance with the program stored in the internal ROM or the EEPROM. The program has a routine or a segment for OPC (optimum power control).

Figure 7:
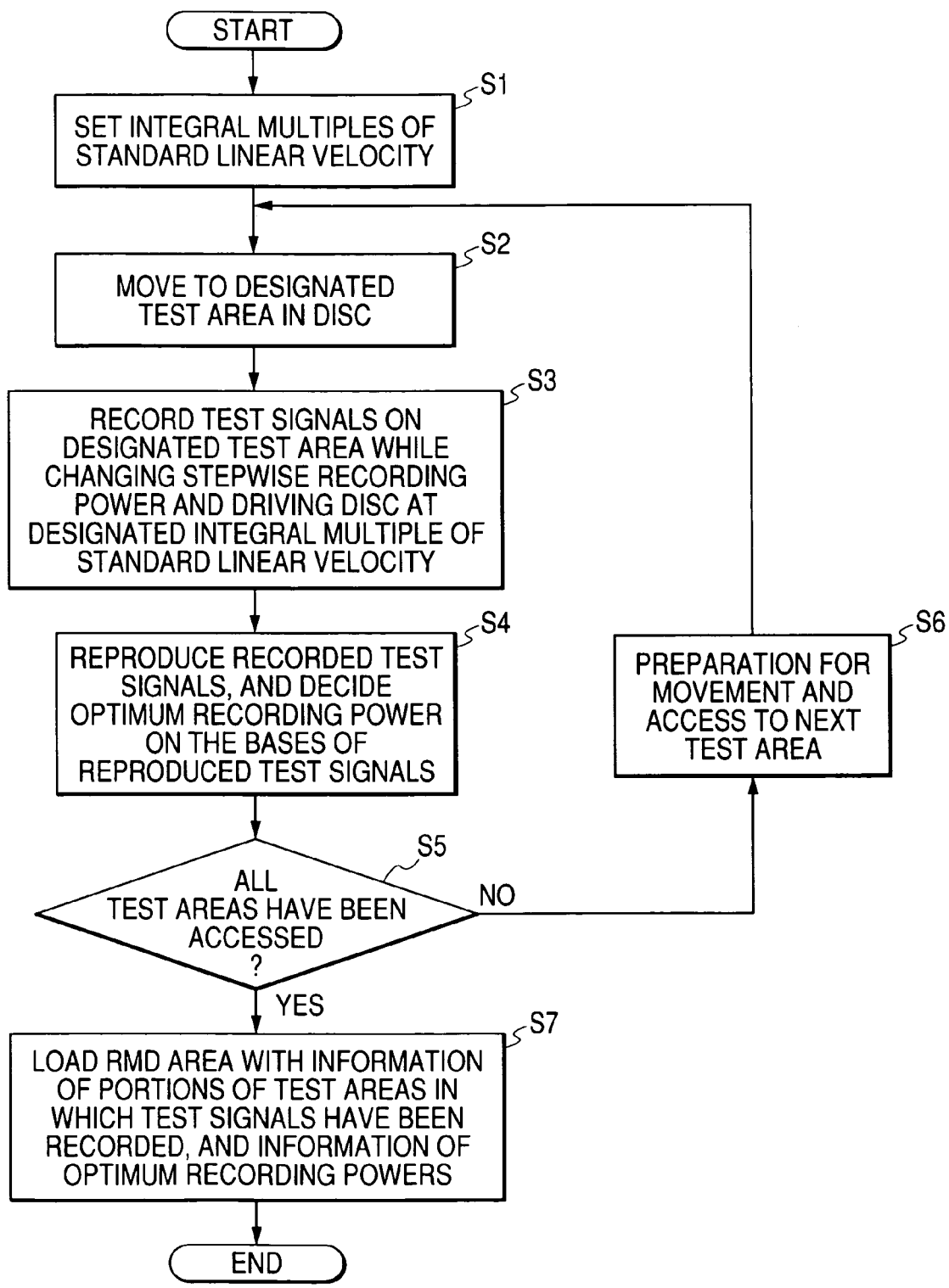
FIG. 7 is a flowchart of an OPC segment of a program for a controller in FIG. 3.

FIG. 7 is a flowchart of the OPC segment of the program. With reference to FIG. 7, a first step S1 of the program segment controls the servo circuit 19 to move the optical pickup 13 to a position corresponding to the RMD area 34 in the optical disc 11. The step S1 adjusts the optical pickup 13 via the servo circuit 19 so that the RMD area 34 will be scanned by the laser beam, and the RMD information including the PCA management information pieces (the address-related information pieces) will be reproduced therefrom. The step S1 controls the switch 20 so that the reproduced PCA management information pieces will be sent from the optical pickup 13 to the controller 14 via the reproducing amplifier 21 and the decoder.

The step S1 checks whether the inner PCA 33, the outer PCA 38, and the data-area test zones r1 and r2 can be used for the present test recording and reproduction. The step S1 detects the boundary within each of the inner PCA 33, the outer PCA 38, and the data-area test zones r1 and r2 between a usable portion and a used portion from the reproduced PCA management information pieces. On the basis of the detected boundary, the step S1 decides a position within each of the inner PCA 33, the outer PCA 38, and the data-area test zones r1 and r2 from which the recording of a test signal should be started during the present test recording and reproduction. The decided position is referred to as the test-recording start position.

The step S1 sets an initial integral multiple of the standard linear velocity to a value corresponding to a 6-fold linear velocity. The step S1 sets a first intermediate integral multiple of the standard linear velocity to a value corresponding to an 8-fold linear velocity. The step S1 sets a second intermediate integral multiple of the standard linear velocity to a value corresponding to an 12-fold linear velocity. The step S1 sets a final integral multiple of the standard linear velocity to a value corresponding to a 16-fold linear velocity.

The step S1 sets a variable "k" to "1". A value "k" of "1" is assigned to the inner PCA 33 and the initial integral multiple of the standard linear velocity (the 6-fold linear velocity). A value "k" of "2" is assigned to the data-area test zone r1 and the first intermediate integral multiple of the standard linear velocity (the 8-fold linear velocity). A value "k" of "3" is assigned to the data-area test zone r2 and the second intermediate integral multiple of the standard linear velocity (the 12-fold linear velocity). A value "k" of "4" is assigned to the outer PCA 38 and the final integral multiple of the standard linear velocity (the 16-fold linear velocity). In later steps, the value "k" will be used to designate one among the four test recording areas, that is, the inner PCA 33, the outer PCA 38, and the data-area test zones r1 and r2. The value "k" will also be used to designate one among the initial, first intermediate, second intermediate, and final integral multiples of the standard linear velocity, that is, the 6-fold, 8-fold, 12-fold, and 16-fold linear velocities. After the step S1, the program advances to a step S2.

A step S2 following the step S1 commands the optical pickup 13 via the servo circuit 19 to move to a position accorded with one of the four test recording areas (the inner PCA 33, the outer PCA 38, and the data-area test zones r1 and r2) which is designated by the current value "k". When k=1, the position of the optical pickup 13 is accorded with the inner PCA 33. When k=2, the position of the optical pickup 13 is accorded with the data-area test zone r1. When k=3, the position of the optical pickup 13 is accorded with the data-area test zone r2. When k=4, the position of the optical pickup 13 is accorded with the outer PCA 38. Specifically, the step S2 controls the servo circuit 19 to move the optical pickup 13 to a position corresponding to the test-recording start position within the designated test recording area (the designated one of the inner PCA 33, the outer PCA 38, and the data-area test zones r1 and r2).

A step S3 following the step S2 notifies the servo circuit 19 of one of the initial, first intermediate, second intermediate, and final integral multiples of the standard linear velocity (the 6-fold, 8-fold, 12-fold, and 16-fold linear velocities) which is designated by the current value "k" and at which the optical disc 11 should be scanned by the laser beam. When k=1, the initial integral multiple of the standard linear velocity (the 6-fold linear velocity) is notified to the servo circuit 19 as designated one. When k=2, the first intermediate integral multiple of the standard linear velocity (the 8-fold linear velocity) is notified to the servo circuit 19 as designated one. When k=3, the second intermediate integral multiple of the standard linear velocity (the 12-fold linear velocity) is notified to the servo circuit 19 as designated one. When k=4, the final integral multiple of the standard linear velocity (the 16-fold linear velocity) is notified to the servo circuit 19 as designated one. The step S3 controls the servo circuit 19 to detect a wobble signal in the RF signal, and to drive the spindle motor 12 in response to the designated integral multiple of the standard linear velocity and the detected wobble signal to harmonize the detected wobble signal with the designated integral multiple of the standard linear velocity. Thus, the step S3 controls the actual linear velocity at the designated integral multiple of the standard linear velocity (the 6-fold, 8-fold, 12-fold, or 16-fold linear velocity). The step S3 starts recording a test signal on the designated test recording area (the designated one of the inner PCA 33, the outer PCA 38, and the data-area test zones r1 and r2) from the test-recording start position while holding the optical disc 11 scanned by the laser beam at a linear velocity equal to the designated integral multiple of the standard linear velocity (the 6-fold, 8-fold, 12-fold, or 16-fold linear velocity).

Specifically, the step S3 controls the calibration signal generation circuit 15 to repetitively generate a calibration signal (a test signal) "a". One calibration signal "a" is assigned to one sync frame. The step S3 controls the switch 16 to pass the calibration signal "a" from the calibration signal generation circuit 15 to the recording amplifier 17. The recording amplifier 17 enlarges the calibration signal "a" at a variable gain. The step S3 controls the recording amplifier 17 via the D/A converter 18 to vary its gain in turn among twenty-six predetermined different values on an increasing stepwise basis. The gain of the recording amplifier 17 is held at each of the 26 different values for one sync frame or one calibration signal "a". The step S3 controls the switch 20 to pass the enlarged calibration signal "a" from the recording amplifier 17 to the optical pickup 13. The optical pickup 13 modulates the laser beam in accordance with the calibration signal "a". The modulated laser beam is applied from the optical pickup 13 to the optical disc 11. The recording power of the modulated laser beam depends on the amplitude of the enlarged calibration signal "a", that is, the gain of the recording amplifier 17. Thus, the recording power of the modulated laser beam is varied in turn among twenty-six predetermined different levels on an increasing stepwise basis. The recording power of the modulated laser beam is held at each of the twenty-six predetermined different values for one sync frame or one calibration signal "a". Specifically, the step S3 controls the servo circuit 19 so that the designated test recording area (the designated one of the inner PCA 33, the outer PCA 38, and the data-area test zones r1 and r2) is scanned by the modulated laser beam at a linear velocity equal to the designated integral multiple of the standard linear velocity, and thereby the calibration signal "a" is repetitively recorded on the designated test recording area. During the recording of the calibration signals "a", the recording power of the laser beam is varied in turn among the twenty-six predetermined different levels on an increasing stepwise basis. Each of the twenty-six predetermined different levels is assigned to one sync frame or one calibration signal "a". Accordingly, there are the twenty-six recorded calibration signals "a" which correspond to the twenty-six predetermined different recording power levels respectively.

A step S4 following the step S3 controls the servo circuit 19 to return the optical pickup 13 to a position corresponding to the test-recording start position within one of the four test recording areas (the inner PCA 33, the outer PCA 38, and the data-area test zones r1 and r2) which is designated by the current value "k". The step S4 adjusts the optical pickup 13 via the servo circuit 19 so that a related portion of the designated test recording area will be scanned by the laser beam, and the latest recorded calibration signals "a" will be sequentially reproduced therefrom. The step S4 controls the switch 20 to pass each of the reproduced calibration signals "a" from the optical pickup 13 to the peak detection circuit 22, the bottom detection circuit 23, and the average value detection circuit 24 via the reproducing amplifier 21. The peak detection circuit 22 detects the peak level provided by the 11T signal in each of the reproduced calibration signals "a" corresponding to the twenty-six predetermined different recording power levels respectively. The bottom detection circuit 23 detects the bottom level provided by the 11T signal in each of the reproduced calibration signals "a" corresponding to the twenty-six predetermined different recording power levels respectively. The average value detection circuit 24 detects the average level of the 3T signal in each of the reproduced calibration signals "a" corresponding to the twenty-six predetermined different recording power levels respectively. Information about the detected peak level provided by the 11T signal, information about the detected bottom level provided by the 11T signal, and information about the detected average level of the 3T signal are sent from the peak detection circuit 22, the bottom detection circuit 23, and the average value detection circuit 24 to the controller 14 via the switch 25 and the A/D converter 26. Thus, the controller 14 is informed of the detected peak level provided by the 11T signal, the detected bottom level provided by the 11T signal, and the detected average level of the 3T signal for each of the twenty-six predetermined different recording power levels.

The step S4 calculates the middle value between the detected peak level provided by the 11T signal and the detected bottom level provided by the 11T signal for each of the twenty-six predetermined different recording power levels. The step S4 compares the calculated middle value with the detected average level of the 3T signal to compute an asymmetry value $\beta$ for each of the twenty-six predetermined different recording power levels. Specifically, the step S4 computes the difference between the calculated middle value and the detected average level, and also the peak-to-peak value between the detected peak level and the detected bottom level. Then, the step S4 divides the computed difference by the computed peak-to-peak value to get the asymmetry value $\beta$. The step S4 gets the computed asymmetry values $\beta$ for the twenty-six predetermined different recording power levels respectively. The step S4 selects one from the computed asymmetry values $\beta$ which is the closest to a predetermined target asymmetry value $\beta$. The predetermined target asymmetry value $\beta$ may depend on the value "k", that is, the designated integral multiple of the standard linear velocity. The step S4 detects one among the twenty-six predetermined different recording power levels which corresponds to the selected asymmetry value $\beta$. The step S4 designates the detected recording power level as an optimum laser-beam recording power value for one of the initial, first intermediate, second intermediate, and final integral multiples of the standard linear velocity (one of the 6-fold, 8-fold, 12-fold, and 16-fold linear velocities) which is designated by the current value "k". When k=1, the detected recording power level is designated as an optimum laser-beam recording power value P6× for the 6-fold linear velocity. When k=2, the detected recording power level is designated as an optimum laser-beam recording power value P8× for the 8-fold linear velocity. When k=3, the detected recording power level is designated as an optimum laser-beam recording power value P12× for the 12-fold linear velocity. When k=4, the detected recording power level is designated as an optimum laser-beam recording power value P16× for the 16-fold linear velocity.

The step S4 may decide the optimum laser-beam recording power value for the designated linear velocity (the designated integral multiple of the standard linear velocity) in the following way. An optimum laser-beam recording power for the designated linear velocity which corresponds to the predetermined target asymmetry value $\beta$ is estimated from at least two among the twenty-six predetermined different recoding power levels through interpolation responsive to at least two among the computed asymmetry values P.

A step S5 following the step S4 compares the value "k" with "4" to decide whether or not all the four test recording areas (the inner PCA 33, the outer PCA 38, and the data-area test zones r1 and r2) have been accessed. When the value "k" is equal to "4", that is, when all the four test recording areas have been accessed, the program advances from the step S5 to a step S7. Otherwise, the program advances from the step S5 to a step S6.

The step S6 increments the value "k" by "1" so that next one of the four test recording areas (the inner PCA 33, the outer PCA 38, and the data-area test zones r1 and r2) will be accessed in a later stage. After the step S6, the program returns to the step S2.

Accordingly, the sequence of the steps S2, S3, and S4 is executed for each of k=1, k=2, k=3, and k=4. Consequently, there are provided the optimum laser-beam recording power value P6× for the 6-fold linear velocity, the optimum laser-beam recording power value P8× for the 8-fold linear velocity, the optimum laser-beam recording power value P12× for the 12-fold linear velocity, and the optimum laser-beam recording power value P16× for the 16-fold linear velocity.

The step S7 generates an information piece representing addresses of the portion of the inner PCA 33 on which the latest calibration signals "a" have been recorded. The step S7 generates an information piece representing the optimum laser-beam recording power value P6× for the 6-fold linear velocity. The step S7 generates an information piece representing addresses of the portion of the data-area test zone r1 on which the latest calibration signals "a" have been recorded. The step S7 generates an information piece representing the optimum laser-beam recording power value P8× for the 8-fold linear velocity. The step S7 generates an information piece representing addresses of the portion of the data-area test zone r2 on which the latest calibration signals "a" have been recorded. The step S7 generates an information piece representing the optimum laser-beam recording power value P12× for the 12-fold linear velocity. The step S7 generates an information piece representing addresses of the portion of the outer PCA 38 on which the latest calibration signals "a" have been recorded. The step S7 generates an information piece representing the optimum laser-beam recording power value P16× for the 16-fold linear velocity.

The step S7 outputs the generated information pieces (the address-related information pieces and the optimum-power-related information pieces) to an encoder not shown in the drawings. The step S7 controls the switches 16 and 20 so that the information pieces will be propagated from the encoder to the optical pickup 13 through the recording amplifier 17. The step S7 controls the servo circuit 19 to move the optical pickup 13 to a position corresponding to the RMD area 34 in the optical disc 11. The step S7 adjusts the optical pickup 13 via the servo circuit 19 so that the RMD area 34 will be scanned by the laser beam, and the previously-indicated information pieces (the address-related information pieces and the optimum-power-related information pieces) will be recorded thereon. After the step S7, the current execution cycle of the program segment ends.

The ROM or the EEPROM in the controller 14 stores data representing the predetermined target asymmetry value $\beta$. For example, the predetermined target asymmetry value $\beta$ is equal or close to 0%. According to the DVD-RW standards, the predetermined target asymmetry value $\beta$ is in the range of −5% to +15% for a DVD-RW under prescribed conditions. Generally, the predetermined target asymmetry value $\beta$ is chosen to depend on the type of an optical disc, the operation characteristics of an optical pickup, and the recording conditions such as the recording waveform (the recording strategy) of a laser beam. Experiments using optical discs of different types are previously performed, and target asymmetry values $\beta$ are predetermined on the basis of the results of the experiments for the respective optical disc types. Data representing one of the predetermined target asymmetry values $\beta$ which corresponds to the optical disc 11 is written into the ROM or the EEPROM in the controller 14 during the manufacture of the drive apparatus.

In general, a DVD-RW which can be used as the optical disc 11 stores an ID information piece intrinsic to the disc, an information piece representing a recording laser power level recommended by the maker of the disc, an information piece representing a ratio $\epsilon$ between the recommended recording laser power level and an erasing laser power level, an information piece representing a head-pulse width in the recording waveform of a laser beam, an information piece representing an intermediate-multiple-pulse width in the recording waveform, and an information piece representing a cooling-pulse width or a rear-end-pulse width in the recording waveform. The head-pulse width, the intermediate-multiple-pulse width, and the cooling-pulse width or the rear-end-pulse width define the recording strategy of the laser beam. In the presence of an asymmetry value $\beta$, the DVD-RW stores an information piece representing a recommended asymmetry value $\beta$ together with an information piece representing a linear velocity or linear velocities. Specifically, the DVD-RW stores an information piece representing recommended asymmetry values $\beta$ for respective different integral multiples of the standard linear velocity.

During the manufacture of the drive apparatus, the optical disc 11 is evaluated. In the case where the result of the evaluation shows that the recommended asymmetry value or values $\beta$ represented by an information piece recorded on the optical disc 11 are acceptable to the drive apparatus, the information piece representing the recommended asymmetry value or values $\beta$ is written into the ROM or the EEPROM in the controller 14 as an information piece representing predetermined target one or ones. Furthermore, an ID information piece intrinsic to the optical disc 11 is written into the ROM or the EEPROM in the controller 14. In the case where the result of the evaluation shows that the recommended asymmetry value or values $\beta$ represented by the information piece recorded on the optical disc 11 are acceptable to the drive apparatus after they are slightly changed by offsets, the information piece representing the recommended asymmetry value or values $\beta$ and also an information piece representing the offsets are written into the ROM or the EEPROM in the controller 14 as an information piece representing predetermined target one or ones. Furthermore, the ID information piece intrinsic to the optical disc 11 is written into the ROM or the EEPROM in the controller 14. In the absence of an information piece from the optical disc 11 which represents a recommended asymmetry value or values $\beta$, a target asymmetry value $\beta$ corresponding to an optimum recording laser power level is predetermined by measurement using the optical disc 11. In this case, an information piece representing the predetermined target asymmetry value $\beta$ is written into the ROM or the EEPROM in the controller 14. Furthermore, the ID information piece intrinsic to the optical disc 11 is written into the ROM or the EEPROM in the controller 14.

On the other hand, in the case where the result of the evaluation shows that the recommended asymmetry value or values $\beta$ represented by the information piece recorded on the optical disc 11 are unacceptable to the drive apparatus, the information piece representing the recommended asymmetry value or values $\beta$ is merely written into the ROM or the EEPROM in the controller 14 as an information piece unrelated to predetermined target one or ones. Furthermore, the ID information piece intrinsic to the optical disc 11 is written into the ROM or the EEPROM in the controller 14.

It should be noted that the step S7 may be omitted from the program segment in FIG. 7. In this case, the step S4 has additional functions as follows. The step S4 generates an information piece representing addresses of the portion of the designated test recording area on which the latest calibration signals "a" have been recorded. The step S4 generates an information piece representing the optimum laser-beam recording power value for the designated linear velocity (the designated integral multiple of the standard linear velocity). The step S4 outputs the generated information pieces (the address-related information piece and the optimum-power-related information piece) to the encoder. The step S4 controls the switches 16 and 20 so that the information pieces will be propagated from the encoder to the optical pickup 13 through the recording amplifier 17. The step S4 controls the servo circuit 19 to move the optical pickup 13 to a position corresponding to the RMD area 34 in the optical disc 11. The step S4 adjusts the optical pickup 13 via the servo circuit 19 so that the RMD area 34 will be scanned by the laser beam, and the previously-indicated information pieces (the address-related information piece and the optimum-power-related information piece) will be recorded thereon.

The step S4 in FIG. 7 may repeat, a plurality of times (for example, four times), the test recording and reproduction procedure which uses the outer PCA 38 to decide an optimum laser-beam recording power value P16× for the 16-fold linear velocity. In this case, there are sometimes provided a plurality of different optimum laser-beam recording power values P16×. On the basis of the different optimum laser-beam recording power values P16×, an actually-used final value P16× is decided for the 16-fold linear velocity. In this case, the actually-used final value P16× for the 16-fold linear velocity is reliable regardless of scratches or fingerprints on the outer PCA 38. One of the different optimum laser-beam recording power values P16× may be selected as an actually-used final value P16× for the 16-fold linear velocity. For example, the step S4 discards one or ones among the different optimum laser-beam recording power values P16× which are at least a given value apart from an expected level. The step S4 averages the remaining optimum laser-beam recording power values P16× to get an actually-used final value P16× for the 16-fold linear velocity. Alternatively, the step S4 may designate the minimum one among the remaining optimum laser-beam recording power values P16× as an actually-used final value P16× for the 16-fold linear velocity.

Figure 8:
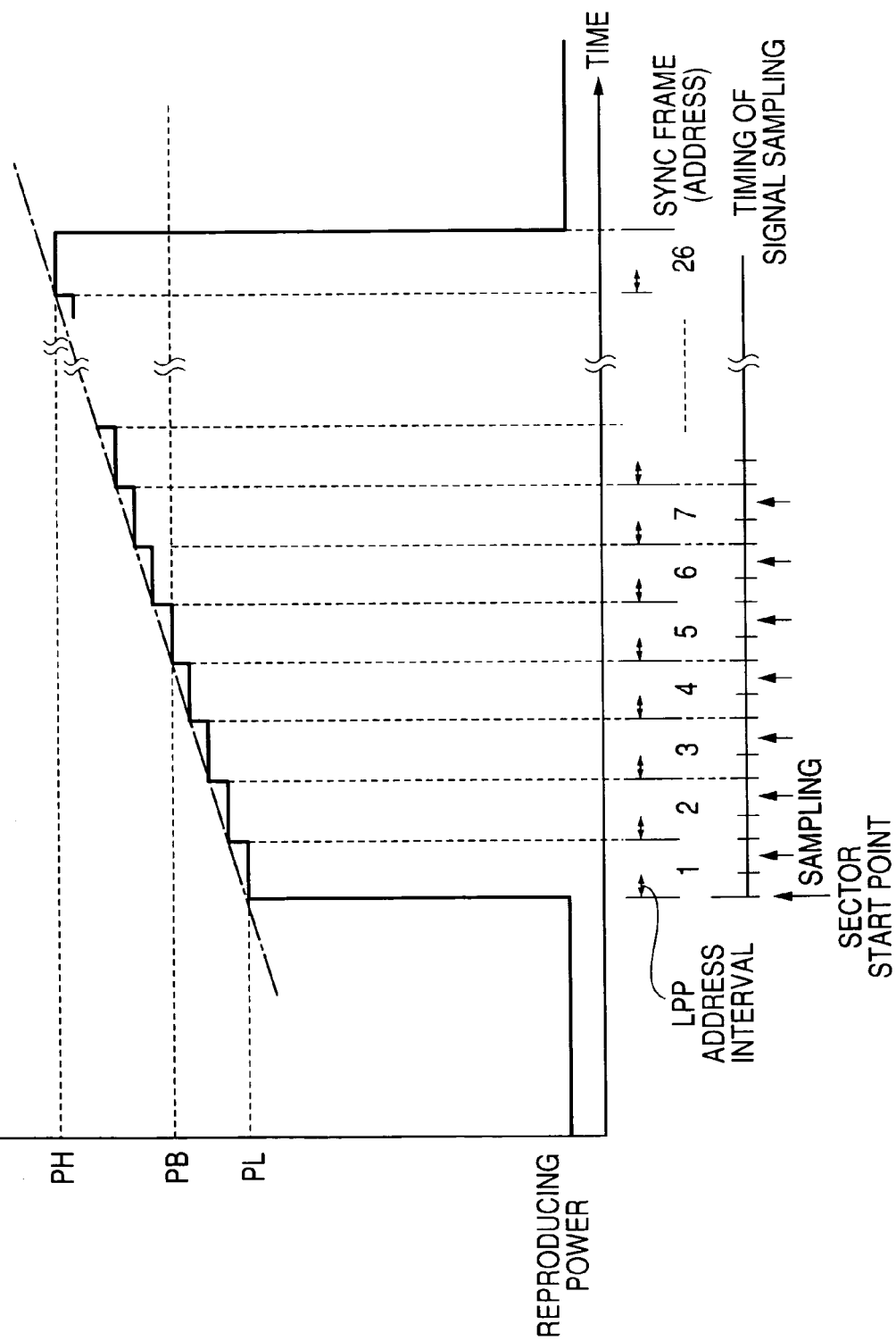
FIG. 8 is a time-domain diagram of a variation in the recording power of a laser beam in the drive apparatus of FIG. 3.

With reference to FIG. 8, during one test recording procedure, a test signal "a" in a 1-sync-frame-corresponding quantity is recorded on the inner PCA 33, the outer PCA 38, or one of the data-area test zones r1 and r2 twenty-six times while the recording power of the laser beam is sequentially changed among twenty-six predetermined different levels on an increasing stepwise basis. Thus, one test recording procedure is composed of twenty-six 1-sync-frame-corresponding stages each assigned to the once recording of a 1-sync-frame-corresponding test signal "a" and one recording power level of the laser beam. One test recording procedure corresponds to one sector or a 1-sector interval. Specifically, the twenty-six predetermined different levels of the recording power of the laser beam are a lower limit level PL, an upper limit level PH, and twenty-four intermediate levels between the lower limit level PL and the upper limit level PH. The lower limit level PL is between a reproducing power of the laser beam and an expected optimum recording power PB of the laser beam. The lower limit level PL may be equal to the reproducing power of the laser beam. In this case, one of the lower limit level PL, the twenty-four intermediate levels, and the upper limit level PH is equal to the reproducing power of the laser beam. The upper limit level PH is greater than the expected optimum recording power PB of the laser beam. Thus, during one test recording procedure, a test signal "a" in a 1-sync-frame-corresponding quantity is recorded on the inner PCA 33, the outer PCA 38, or one of the data-area test zones r1 and r2 twenty-six times while the recording power of the laser beam is increased stepwise from the lower limit level PL to the upper limit level PH through the twenty-four intermediate levels. Preferably, the lower limit level PL, the twenty-four intermediate levels, and the upper limit level PH are spaced at prescribed equal intervals. The lower limit level PL, the twenty-four intermediate levels, and the upper limit level PH may be spaced at prescribed different intervals.

As previously mentioned, LPP address signals are formed by pre-pits in land portions of the optical disc 11. An LPP address signal assigned to a former sync frame in every ECC block serves as an indicator of timing information, and is thus important. According to the increasing stepwise change of the recording power of the laser beam in FIG. 8, during a former sync frame in an ECC block, the recording power of the laser beam is lower than the expected optimum level PB so that recording marks formed in a groove portion of the optical disc 11 are prevented from reaching land pre-pits (LPP). Therefore, the important LPP address signal (the timing information) can be correctly reproduced from the optical disc 11 even during or after the recording of the test signal "a" thereon.

The wobble signal and the address signal are recovered from the RF signal. The timing signals for the peak detection circuit 22, the bottom detection circuit 23, and the average value detection circuit 24 are generated in response to the recovered wobble signal and the recovered address signal. The generated timing signals represent timings related to every sync frame. The peak detection circuit 22, the bottom detection circuit 23, and the average value detection circuit 24 sample the RF signal in response to the timing signals to get peak, bottom, and average levels used to compute an asymmetry value β for each of the twenty-six predetermined different recording power levels. The arrangement including the circuit for generating the timing signals from the wobble signal and the address signal, the peak detection circuit 22, the bottom detection circuit 23, and the average value detection circuit 24 can simplify the drive apparatus.

During an initial part of one test recording procedure, the recording power level of the laser beam is relatively low. The drive apparatus is designed to correctly reproduce, from the optical disc 11, the test signal "a" recorded by the laser beam with a low recording power level. Thus, during the reproduction of a recorded signal from the optical disc 11 or a test reproduction procedure after the test recording procedure, even when the RF signal has a relatively small degree of modulation, it is possible to prevent analog-based level detection from erroneously concluding the RF signal to be absent.

Second Embodiment

A second embodiment of this invention is similar to the first embodiment thereof except for design changes mentioned hereafter. In the second embodiment of this invention, the controller 14 (see FIG. 3) operates to change the recording power of the laser beam in a profile different from that in FIG. 8 during every test recording procedure.

Figure 9:
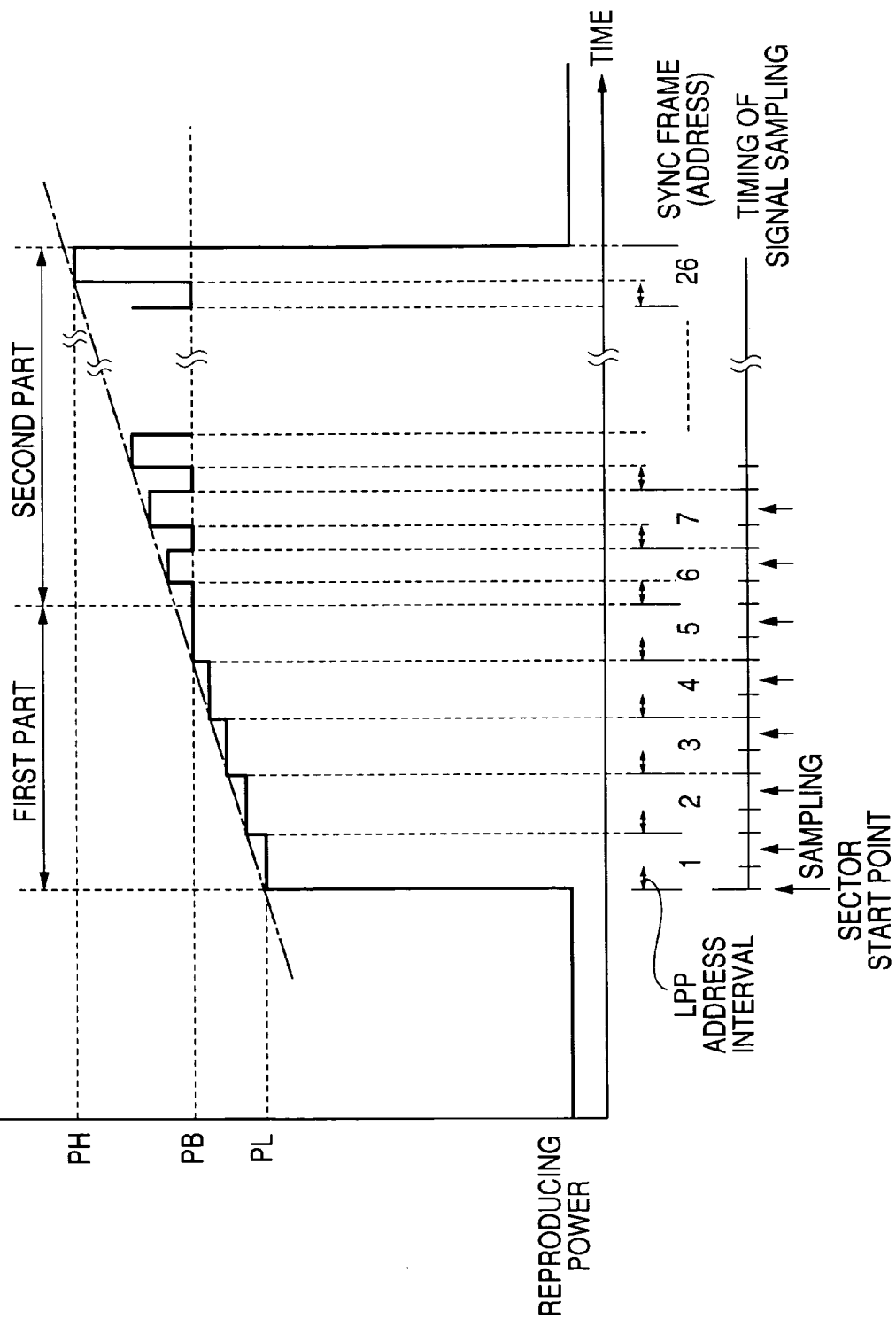
FIG. 9 is a time-domain diagram of a variation in the recording power of a laser beam in a second embodiment of this invention.

FIG. 9 shows the recording laser power change profile in the second embodiment of this invention. With reference to FIG. 9, the recording laser power change profile is divided into a first part and a second part which follows the first part in time domain. Accordingly, one test recording procedure is divided into a first part and a second part. One of the twenty-four intermediate levels of the recording power of the laser beam between the lower limit level PL and the upper limit level PH is equal or close to the expected optimum recording power PB, and is referred to as the specified level or the reference level.

During the first part of one test recording procedure, a test signal "a" in a 1-sync-frame-corresponding quantity is recorded on the inner PCA 33, the outer PCA 38, or one of the data-area test zones r1 and r2 plural times while the recording power of the laser beam is increased stepwise from the lower limit level PL to the specified level (equal or close to the expected optimum recording power PB) through intermediate levels lower than the specified level. The first part of one test recording procedure is composed of plural 1-sync-frame-corresponding stages each assigned to the once recording of a test signal "a" and one recording power level of the laser beam.

During the second part of one test recording procedure, a test signal "a" in a 1-sync-frame-corresponding quantity is recorded on the inner PCA 33, the outer PCA 38, or one of the data-area test zones r1 and r2 plural times while the recording power of the laser beam is increased from the intermediate level immediately greater than the specified level (equal or close to the expected optimum recording power PB) to the higher limit level PH through intermediate levels greater than the specified level. The second part of one test recording procedure is composed of plural 1-sync-frame-corresponding stages each assigned to the once recording of a test signal "a" and one recording power level of the laser beam. During the second part of one test recording procedure, the recording power of the laser beam is repetitively set or returned to a given level while being changed among the intermediate levels and the upper limit level PH. Preferably, the given level is equal to the specified level (equal or close to the expected optimum recording power PB). The given level may be lower than a recording range of the laser power or equal to the reproducing power of the laser beam. Specifically, in a time range within every sync frame which includes a timing of a related LPP address signal and time positions immediately before and after the timing of the related LPP address signal, the recording power of the laser beam is held at the given level. In the remaining time range within every sync frame, the recording power of the laser beam is held at related one among the intermediate levels and the higher limit level PH. Thus, the remaining time range is referred to as the effective time range. It should be noted that a prescribed level equal or close to the expected optimum recording power PB may be used as the given level.

The peak detection circuit 22, the bottom detection circuit 23, and the average value detection circuit 24 (see FIG. 3) are controlled in response to the timing signals outputted from the decoder. This control is designed to enable the following operation of the peak detection circuit 22, the bottom detection circuit 23, and the average value detection circuit 24.

The peak detection circuit 22 samples and holds a peak level of the RF signal at a timing within a time interval corresponding to the effective time range within every sync frame. The bottom detection circuit 23 samples and holds a bottom level of the RF signal at a timing within a time interval corresponding to the effective time range within every sync frame. The average value detection circuit 24 samples and holds an average level of the RF signal at a timing within a time interval corresponding to the effective time range within every sync frame.

As previously mentioned, during the second part of one test recording procedure, in a time range within every sync frame which includes a timing of a related LPP address signal and time positions immediately before and after the timing of the related LPP address signal, the recording power of the laser beam is held at the given level. The given level is relatively low. For example, the given level is equal to the specified level (equal or close to the expected optimum recording power PB). Thus, related recording marks formed in a groove portion of the optical disc 11 are prevented from reaching land pre-pits (LPP). In other words, the recorded test signal "a" is prevented from interfering with the important LPP address signal. Therefore, the important LPP address signal (the timing information) can be correctly reproduced from the optical disc 11 even during or after the recording of the test signal "a" thereon.

Third Embodiment

A third embodiment of this invention is similar to the first embodiment thereof except for design changes mentioned hereafter. In the third embodiment of this invention, the controller 14 (see FIG. 3) operates to change the recording power of the laser beam in a profile different from that in FIG. 8 during every test recording procedure.

Figure 10:
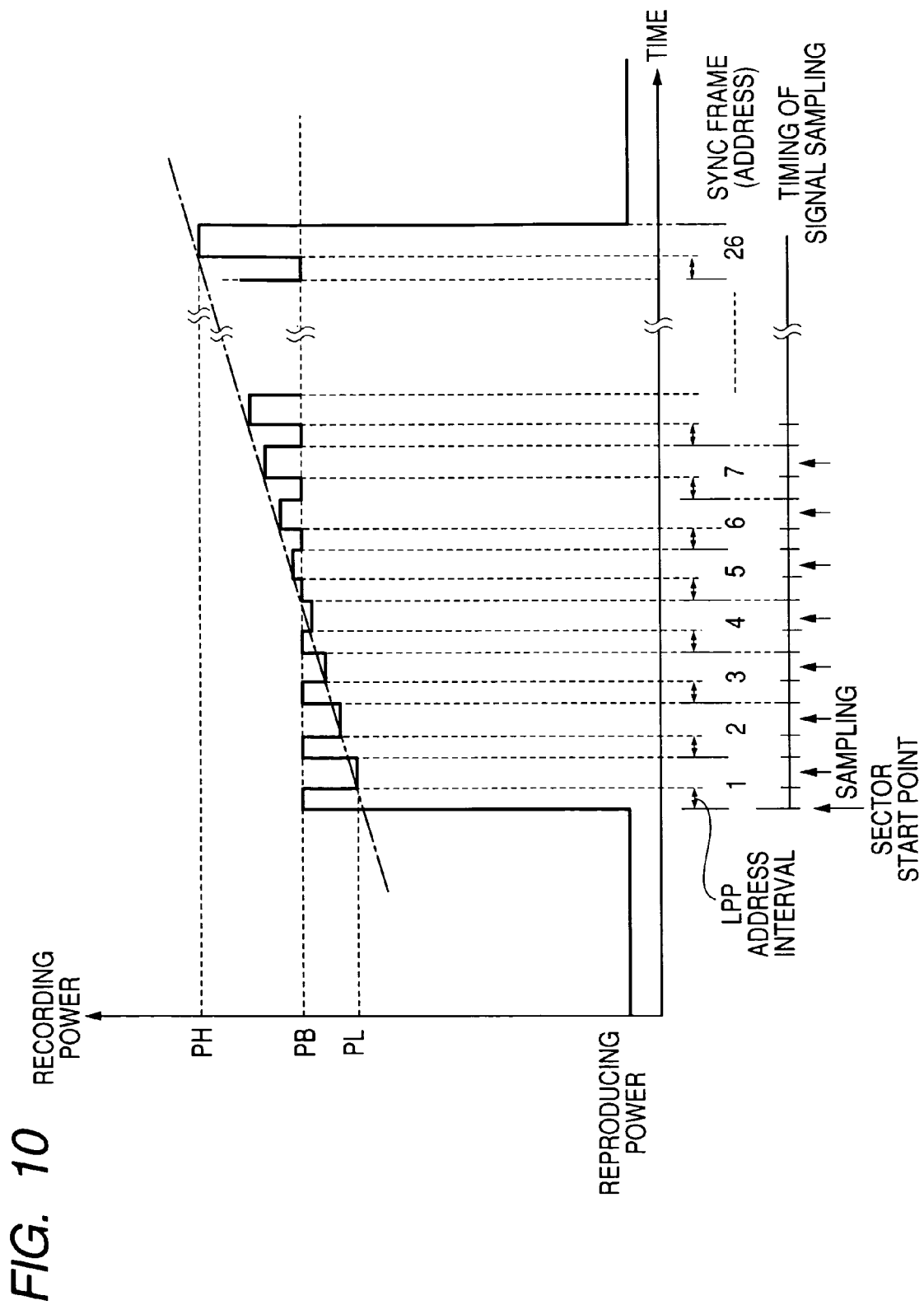
FIG. 10 is a time-domain diagram of a variation in the recording power of a laser beam in a third embodiment of this invention.

FIG. 10 shows the recording laser power change profile in the third embodiment of this invention. With reference to FIG. 10, one of the twenty-four intermediate levels of the recording power of the laser beam between the lower limit level PL and the upper limit level PH is equal or close to the expected optimum recording power PB, and is referred to as the specified level or the reference level.

During one test recording procedure, a test signal "a" in a 1-sync-frame-corresponding quantity is recorded on the inner PCA 33, the outer PCA 38, or one of the data-area test zones r1 and r2 twenty-six times while the recording power of the laser beam is increased from the lower limit level PL to the higher limit level PH through the intermediate levels. One test recording procedure is composed of twenty-six 1-sync-frame-corresponding stages each assigned to the once recording of a test signal "a" and one recording power level of the laser beam. During one test recording procedure, the recording power of the laser beam is repetitively set or returned to a given level while being changed among the lower limit level PL, the intermediate levels, and the upper limit level PH. Preferably, the given level is equal to the specified level (equal or close to the expected optimum recording power PB). The given level may be lower than a recording range of the laser power or equal to the reproducing power of the laser beam. Specifically, in a time range within every sync frame which includes a timing of a related LPP address signal and time positions immediately before and after the timing of the related LPP address signal, the recording power of the laser beam is held at the given level. In the remaining time range within every sync frame, the recording power of the laser beam is held at related one among the lower limit level PL, the intermediate levels, and the upper limit level PH. Thus, the remaining time range is referred to as the effective time range. It should be noted that a prescribed level equal or close to the expected optimum recording power PB may be used as the given level.

The peak detection circuit 22, the bottom detection circuit 23, and the average value detection circuit 24 (see FIG. 3) are controlled in response to the timing signals outputted from the decoder. This control is designed to enable the following operation of the peak detection circuit 22, the bottom detection circuit 23, and the average value detection circuit 24.

The peak detection circuit 22 samples and holds a peak level of the RF signal at a timing within a time interval corresponding to the effective time range within every sync frame. The bottom detection circuit 23 samples and holds a bottom level of the RF signal at a timing within a time interval corresponding to the effective time range within every sync frame. The average value detection circuit 24 samples and holds an average level of the RF signal at a timing within a time interval corresponding to the effective time range within every sync frame.

As previously mentioned, during one test recording procedure, in a time range within every sync frame which includes a timing of a related LPP address signal and time positions immediately before and after the timing of the related LPP address signal, the recording power of the laser beam is held at the given level. The given level is relatively low. For example, the given level is equal to the specified level (equal or close to the expected optimum recording power PB). Thus, related recording marks formed in a groove portion of the optical disc 11 are prevented from reaching land pre-pits (LPP). In other words, the recorded test signal "a" is prevented from interfering with the important LPP address signal. Therefore, the important LPP address signal (the timing information) can be correctly reproduced from the optical disc 11 even during or after the recording of the test signal "a" thereon.

During one test recording procedure, the recording power level of the laser beam remains repetitively set to the given level. For example, the given level is equal to the specified level (equal or close to the expected optimum recording power PB). Thus, during the reproduction of the recorded test signal "a" from the optical disc 11, the corresponding RF signal continues to have a sufficient degree of modulation so that analog-based level detection is prevented from erroneously concluding the RF signal to be absent.

Fourth Embodiment

A fourth embodiment of this invention is similar to one of the first, second, and third embodiments thereof except that the optical disc 11 has an address signal on a time base equal to that of a data area.

Fifth Embodiment

A fifth embodiment of this invention is similar to one of the first, second, and third embodiments thereof except for the following points. The fifth embodiment of this invention uses the optical disc 11 on and from which an information signal can be recorded and reproduced a plurality of times. A typical example of the optical disc 11 is a phase-change optical disc or a DVD-RW.

During the normal recording mode of operation after the test recording and reproduction, an information signal is written over the test signals "a" in the data-area test zones r1 and r2 of the optical disc 11. Thus, the test zones r1 and r2 are used as effective data-area portions for the recording of the information signal.

Sixth Embodiment

A sixth embodiment of this invention is similar to one of the first, second, and third embodiments thereof except for the following points. The sixth embodiment of this invention uses the optical disc 11 on and from which an information signal can be recorded and reproduced a plurality of times. A typical example of the optical disc 11 is a phase-change optical disc or a DVD-RW.

During the test recording and reproduction, optimum erasing power levels of the laser beam are also decided. The optimum erasing power levels of the laser beam may be updated in accordance with the newly-decided optimum recording power levels of the laser beam.

Seventh Embodiment

A seventh embodiment of this invention is similar to one of the first, second, and third embodiments thereof except that the optical disc 11 uses a Blu-ray Disc or one of another type.

Eighth Embodiment

An eighth embodiment of this invention is similar to one of the first, second, and third embodiments thereof except that the parameter relating to the quality of each reproduced test signal "a" includes the degree of modulation, the value obtained by a γ method of differentiating the modulation degree, the error rate, or the jitter rather than the asymmetry value β.

What is claimed is:

1. A method of controlling a recording laser power for a disc-shaped recording medium on which an address signal is previously recorded for every prescribed recording unit related to a track in the disc-shaped recording medium, wherein an information signal is recorded on the disc-shaped recording medium in cases where a laser beam containing the information signal is applied to the disc-shaped recording medium while the disc-shaped recording medium is driven and is scanned by the laser beam on a constant-linear-velocity basis, the method comprising the steps of:

sequentially generating test signals;
applying a laser beam inclusive of the generated test signals to a preset test recording area in the disc-shaped recording medium while driving the disc-shaped recording medium at a predetermined constant linear velocity relative to the applied laser beam to record the generated test signals on the preset test recording area in the disc-shaped recording medium;
changing stepwise a recording power of the applied laser beam from a lowest level to a highest level through different intermediate levels, wherein the lowest level, the highest level, and the intermediate levels the recording power of the applied laser beam takes are assigned to the generated test signals respectively;
reproducing the recorded test signals from the preset test recording area in the disc-shaped recording medium; and
deciding an optimum value of a laser-beam recording power on the basis of the reproduced test signals and at least one of the lowest level, the highest level, and the intermediate levels;
wherein the changing step comprises:
changing stepwise the recording power of the applied laser beam from the lowest level to a reference level selected from the intermediate levels through ones of the intermediate levels which are lower than the reference level;
changing stepwise the recording power of the applied laser beam from the reference level to the highest level through ones of the intermediate levels which are higher than the reference level; and
during the stepwise change of the recording power from the reference level to the highest level, setting the recording power of the applied laser beam to a prescribed level for each of spaced time intervals corresponding to portions of the disc-shaped recording medium on which address signals are previously recorded respectively;
wherein the prescribed level is equal or close to the reference level.

2. An apparatus for controlling a recording laser power for a disc-shaped recording medium on which an address signal is previously recorded for every prescribed recording unit related to a track in the disc-shaped recording medium, wherein an information signal is recorded on the disc-shaped recording medium in cases where a laser beam containing the information signal is applied to the disc-shaped recording medium while the disc-shaped recording medium is driven and is scanned by the laser beam on a constant-linear-velocity basis, the apparatus comprising:

first means for sequentially generating test signals;
second means for applying a laser beam inclusive of the test signals generated by the first means to a preset test recording area in the disc-shaped recording medium while driving the disc-shaped recording medium at a predetermined constant linear velocity relative to the applied laser beam to record the generated test signals on the preset test recording area in the disc-shaped recording medium;
third means for changing stepwise a recording power of the laser beam applied by the second means from a lowest level to a highest level through different intermediate levels, wherein the lowest level, the highest level, and the intermediate levels the recording power of the applied laser beam takes are assigned to the generated test signals respectively;
fourth means for reproducing the recorded test signals from the preset test recording area in the disc-shaped recording medium; and fifth means for deciding an optimum value of a laser-beam recording power on the basis of the test signals reproduced by the fourth means and at least one of the lowest level, the highest level, and the intermediate levels;

wherein the third means comprises:

means for changing stepwise the recording power of the applied laser beam from the lowest level to a reference level selected from the intermediate levels through ones of the intermediate levels which are lower than the reference level;

means for changing stepwise the recording power of the applied laser beam from the reference level to the highest level through ones of the intermediate levels which are higher than the reference level; and means for, during the stepwise change of the recording power from the reference level to the highest level, setting the recording power of the applied laser beam to a prescribed level for each of spaced time intervals corresponding to portions of the disc-shaped recording medium on which address signals are previously recorded respectively;

wherein the prescribed level is equal or close to the reference level.

3. A method of controlling a recording laser power for a disc-shaped recording medium on which an address signal is previously recorded for every prescribed recording unit related to a track in the disc-shaped recording medium, wherein an information signal is recorded on the disc-shaped recording medium in cases where a laser beam containing the information signal is applied to the disc-shaped recording medium while the disc-shaped recording medium is driven and is scanned by the laser beam on a constant-linear-velocity basis, the method comprising the steps of:

sequentially generating test signals;

applying a laser beam inclusive of the generated test signals to a preset test recording area in the disc-shaped recording medium while driving the disc-shaped recording medium at a predetermined constant linear velocity relative to the applied laser beam to record the generated test signals on the preset test recording area in the disc-shaped recording medium;

changing stepwise a recording power of the applied laser beam from a lowest level to a highest level through different intermediate levels, wherein the lowest level, the highest level, and the intermediate levels the recording power of the applied laser beam takes are assigned to the generated test signals respectively;

reproducing the recorded test signals from the preset test recording area in the disc-shaped recording medium; and deciding an optimum value of a laser-beam recording power on the basis of the reproduced test signals and at least one of the lowest level, the highest level, and the intermediate levels;

wherein the changing step comprises:

changing stepwise the recording power of the applied laser beam from the lowest level to a level selected from the intermediate levels through ones of the intermediate levels which are lower than the selected level;

changing stepwise the recording power of the applied laser beam from the selected level to the highest level through ones of the intermediate levels which are higher than the selected level; and during the stepwise change of the recording power from one of the lowest level and the selected level to the highest level, setting the recording power of the applied laser beam to a prescribed level for each of spaced time intervals corresponding to portions of the disc-shaped recording medium on which address signals are previously recorded respectively.

4. A method as recited in claim 3, wherein the prescribed level is equal or close to the selected level.

5. A method as recited in claim 3, wherein the prescribed level is equal or close to the lowest level.

6. An apparatus for controlling a recording laser power for a disc-shaped recording medium on which an address signal is previously recorded for every prescribed recording unit related to a track in the disc-shaped recording medium, wherein an information signal is recorded on the disc-shaped recording medium in cases where a laser beam containing the information signal is applied to the disc-shaped recording medium while the disc-shaped recording medium is driven and is scanned by the laser beam on a constant-linear-velocity basis, the apparatus comprising:

first means for sequentially generating test signals;

second means for applying a laser beam inclusive of the test signals generated by the first means to a preset test recording area in the disc-shaped recording medium while driving the disc-shaped recording medium at a predetermined constant linear velocity relative to the applied laser beam to record the generated test signals on the preset test recording area in the disc-shaped recording medium;

third means for changing stepwise a recording power of the laser beam applied by the second means from a lowest level to a highest level through different intermediate levels, wherein the lowest level, the highest level, and the intermediate levels the recording power of the applied laser beam takes are assigned to the generated test signals respectively;

fourth means for reproducing the recorded test signals from the preset test recording area in the disc-shaped recording medium; and fifth means for deciding an optimum value of a laser-beam recording power on the basis of the test signals reproduced by the fourth means and at least one of the lowest level, the highest level, and the intermediate levels;

wherein the third means comprises:

means for changing stepwise the recording power of the applied laser beam from the lowest level to a level selected from the intermediate levels through ones of the intermediate levels which are lower than the selected level;

means for changing stepwise the recording power of the applied laser beam from the selected level to the highest level through ones of the intermediate levels which are higher than the selected level; and means for, during the stepwise change of the recording power from one of the lowest level and the selected level to the highest level, setting the recording power of the applied laser beam to a prescribed level for each of spaced time intervals corresponding to portions of the disc-shaped recording medium on which address signals are previously recorded respectively.

7. An apparatus as recited in claim 6, wherein the prescribed level is equal or close to the selected level.

8. An apparatus as recited in claim 6, wherein the prescribed level is equal or close to the lowest level.

9. A method of controlling a recording laser power for a disc-shaped recording medium on which an address signal is previously recorded for every prescribed recording unit related to a track in the disc-shaped recording medium, wherein an information signal is recorded on the disc-shaped recording medium in cases where a laser beam containing the information signal is applied to the disc-shaped recording medium while the disc-shaped recording medium is driven and is scanned by the laser beam on a constant-linear-velocity basis, the method comprising the steps of:

sequentially generating test signals;

applying a laser beam inclusive of the generated test signals to a preset test recording area in the disc-shaped recording medium while driving the disc-shaped recording medium at a predetermined constant linear velocity relative to the applied laser beam to record the generated test signals on the preset test recording area in the disc-shaped recording medium;

changing stepwise a recording power of the applied laser beam from a lowest level to a highest level through different intermediate levels, wherein the lowest level, the highest level, and the intermediate levels the recording power of the applied laser beam takes are assigned to the generated test signals respectively;

reproducing the recorded test signals from the preset test recording area in the disc-shaped recording medium; and deciding an optimum value of a laser-beam recording power on the basis of the reproduced test signals and at least one of the lowest level, the highest level, and the intermediate levels;

wherein the changing step comprises:

changing stepwise the recording power of the applied laser beam from the lowest level to a level selected from the intermediate levels through ones of the intermediate levels which are lower than the selected level;

changing stepwise the recording power of the applied laser beam from the selected level to the highest level through ones of the intermediate levels which are higher than the selected level; and during the stepwise change of the recording power from the selected level to the highest level, setting the recording power of the applied laser beam to a prescribed level for each of spaced time intervals corresponding to portions of the disc-shaped recording medium on which address signals are previously recorded respectively;

wherein the prescribed level is equal or close to the selected level.

10. An apparatus for controlling a recording laser power for a disc-shaped recording medium on which an address signal is previously recorded for every prescribed recording unit related to a track in the disc-shaped recording medium, wherein an information signal is recorded on the disc-shaped recording medium in cases where a laser beam containing the information signal is applied to the disc-shaped recording medium while the disc-shaped recording medium is driven and is scanned by the laser beam on a constant-linear-velocity basis, the apparatus comprising:

first means for sequentially generating test signals;

second means for applying a laser beam inclusive of the test signals generated by the first means to a preset test recording area in the disc-shaped recording medium while driving the disc-shaped recording medium at a predetermined constant linear velocity relative to the applied laser beam to record the generated test signals on the preset test recording area in the disc-shaped recording medium;

third means for changing stepwise a recording power of the laser beam applied by the second means from a lowest level to a highest level through different intermediate levels, wherein the lowest level, the highest level, and the intermediate levels the recording power of the applied laser beam takes are assigned to the generated test signals respectively;

fourth means for reproducing the recorded test signals from the preset test recording area in the disc-shaped recording medium; and fifth means for deciding an optimum value of a laser-beam recording power on the basis of the test signals reproduced by the fourth means and at least one of the lowest level, the highest level, and the intermediate levels;

wherein the third means comprises:

means for changing stepwise the recording power of the applied laser beam from the lowest level to a level selected from the intermediate levels through ones of the intermediate levels which are lower than the selected level;

means for changing stepwise the recording power of the applied laser beam from the selected level to the highest level through ones of the intermediate levels which are higher than the selected level; and means for, during the stepwise change of the recording power from the selected level to the highest level, setting the recording power of the applied laser beam to a prescribed level for each of spaced time intervals corresponding to portions of the disc-shaped recording medium on which address signals are previously recorded respectively;

wherein the prescribed level is equal or close to the selected level.

\* \* \* \* \*